(12) United States Patent
Aldén et al.

(10) Patent No.: US 11,692,313 B2
(45) Date of Patent: Jul. 4, 2023

(54) METHOD OF MANUFACTURING OF A FOAM-FORMED CELLULOSIC FIBRE-MATERIAL, A BULK SHEET AND A LAMINATED PACKAGING MATERIAL COMPRISING THE CELLULOSIC FIBRE-MATERIAL

(71) Applicant: TETRA LAVAL HOLDINGS & FINANCE S.A., Pully (CH)

(72) Inventors: Mats Aldén, Munka Ljungby (SE); Cristian Neagu, Epalinges (CH); Erkki Saharinen, Helsinki (FI); Jaakko Asikainen, Espoo (FI)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 670 days.

(21) Appl. No.: 16/496,746

(22) PCT Filed: Oct. 13, 2017

(86) PCT No.: PCT/EP2017/076145
§ 371 (c)(1),
(2) Date: Sep. 23, 2019

(87) PCT Pub. No.: WO2018/171913
PCT Pub. Date: Sep. 27, 2018

(65) Prior Publication Data
US 2020/0318292 A1    Oct. 8, 2020

(30) Foreign Application Priority Data

Mar. 24, 2017 (EP) ..................... 17162841
Mar. 24, 2017 (EP) ..................... 17162845

(51) Int. Cl.
*D21H 27/10*    (2006.01)
*D21F 11/00*    (2006.01)
(Continued)

(52) U.S. Cl.
CPC .............. *D21H 27/10* (2013.01); *B32B 5/20* (2013.01); *B32B 7/12* (2013.01); *B32B 15/085* (2013.01);
(Continued)

(58) Field of Classification Search
CPC ........ D21H 27/10; D21H 11/02; D21H 21/18; D21H 21/24; D21H 21/16; D21H 11/18;
(Continued)

(56) References Cited

U.S. PATENT DOCUMENTS 5,409,572 A    4/1995  Kershaw et al.
6,033,524 A    3/2000  Pruszynski et al.
(Continued)

FOREIGN PATENT DOCUMENTS

BR    112018005384 B1 *  4/2022  ............. D21H 11/18
CN    109803827 B *  3/2022  ............. B29C 44/02
(Continued)

OTHER PUBLICATIONS

Machine Translation of JP-2000248489 A (Year: 2000).*
(Continued)

Primary Examiner — Jose A Fortuna
(74) Attorney, Agent, or Firm — Buchanan Ingersoll & Rooney PC

(57) ABSTRACT

The invention relates to a method for manufacturing a foam-formed cellulosic fibre-material comprising coarse cellulosic fibres a cellulose reinforcement fraction. Furthermore, the invention relates to a foam-formed cellulosic fibre-material, a cellulose bulk sheet for a packaging material and a laminated packaging material comprising the foam-formed cellulosic fibre-material.

13 Claims, 6 Drawing Sheets

(51) Int. Cl.

| | |
|---|---|
| *D21H 11/02* | (2006.01) |
| *D21H 17/09* | (2006.01) |
| *D21H 17/17* | (2006.01) |
| *D21H 17/21* | (2006.01) |
| *D21H 17/29* | (2006.01) |
| *D21H 17/53* | (2006.01) |
| *D21H 21/10* | (2006.01) |
| *D21H 21/16* | (2006.01) |
| *D21H 21/18* | (2006.01) |
| *D21H 21/24* | (2006.01) |
| *D21H 23/50* | (2006.01) |
| *D21J 5/00* | (2006.01) |
| *D21H 11/20* | (2006.01) |
| *D21H 21/56* | (2006.01) |
| *B32B 5/20* | (2006.01) |
| *B32B 7/12* | (2006.01) |
| *B32B 15/085* | (2006.01) |
| *B32B 15/20* | (2006.01) |
| *B32B 27/06* | (2006.01) |
| *B32B 27/32* | (2006.01) |
| *B32B 29/00* | (2006.01) |
| *B65D 65/40* | (2006.01) |

(52) U.S. Cl.
CPC ............ *B32B 15/20* (2013.01); *B32B 27/065* (2013.01); *B32B 27/32* (2013.01); *B32B 29/007* (2013.01); *B65D 65/40* (2013.01); *D21F 11/002* (2013.01); *D21H 11/02* (2013.01); *D21H 11/20* (2013.01); *D21H 17/09* (2013.01); *D21H 17/17* (2013.01); *D21H 17/21* (2013.01); *D21H 17/29* (2013.01); *D21H 17/53* (2013.01); *D21H 21/10* (2013.01); *D21H 21/16* (2013.01); *D21H 21/18* (2013.01); *D21H 21/24* (2013.01); *D21H 21/56* (2013.01); *D21H 23/50* (2013.01); *D21J 5/00* (2013.01); *B32B 2262/062* (2013.01); *B32B 2307/7244* (2013.01); *B32B 2439/70* (2013.01)

(58) Field of Classification Search
CPC ........ D21H 11/20; D21H 17/09; D21H 17/17; D21H 17/21; D21H 17/29; D21H 17/53; D21H 21/10; D21H 21/56; D21H 23/50; B32B 5/20; B32B 15/085; B32B 7/12; B32B 27/065; B32B 27/32; B32B 2262/062; B32B 2307/7244; B32B 15/20; B32B 29/007; B32B 2439/70; B32B 5/18; D21F 11/002; B65D 65/40; D21J 5/00
See application file for complete search history.

(56) References Cited

U.S. PATENT DOCUMENTS

| | | | | |
|---|---|---|---|---|
| 2008/0023164 A1* | 1/2008 | Fredlund | ............... | D21H 11/20 162/164.1 |
| 2013/0180680 A1* | 7/2013 | Axrup | ................... | D21H 21/18 162/158 |
| 2014/0090217 A1 | 4/2014 | Jonsson et al. | | |
| 2015/0096700 A1* | 4/2015 | Heiskanen | ............ | D21H 11/02 162/174 |
| 2016/0083808 A1* | 3/2016 | Ramarao | ............... | C13K 13/007 127/29 |
| 2016/0333529 A9* | 11/2016 | Hart | ....................... | D21H 27/30 |
| 2017/0002518 A1 | 1/2017 | Hokka et al. | | |
| 2020/0039713 A1* | 2/2020 | Neagu | ................... | D21H 21/22 |
| 2020/0239652 A1* | 7/2020 | Saukkonen | .......... | C12N 9/2437 |
| 2020/0318292 A1* | 10/2020 | Aldén | ..................... | B32B 15/20 |

FOREIGN PATENT DOCUMENTS

| | | | | | |
|---|---|---|---|---|---|
| EP | 0963485 | A2 | | 12/1999 | |
| EP | 1185736 | A1 | | 3/2002 | |
| EP | 1586705 | A1 | | 10/2005 | |
| EP | 1185736 | B1 | * | 1/2008 | ............ D21H 21/10 |
| EP | 2781652 | A1 | | 9/2014 | |
| EP | 2949597 | A1 | | 12/2015 | |
| EP | 2949597 | A1 | * | 12/2015 | ............... B32B 1/02 |
| EP | 3601673 | B1 | * | 12/2021 | .......... B32B 15/085 |
| EP | 3526038 | B9 | * | 2/2022 | ............ B29C 44/02 |
| GB | 1329409 | A | * | 9/1973 | ............ D21F 1/002 |
| GB | 1397308 | A | * | 6/1975 | .......... D21F 11/002 |
| GB | 1397308 | A | | 6/1975 | |
| JP | S46-022909 | B | | 6/1971 | |
| JP | 2000248489 | A | * | 9/2000 | ............ D21H 21/10 |
| JP | 2006028654 | A | | 2/2006 | |
| JP | 2008-517174 | A | | 5/2008 | |
| JP | 2015-514884 | A | | 5/2015 | |
| JP | 2016-533435 | A | | 10/2016 | |
| JP | 7064117 | B2 | * | 5/2022 | ............ B29C 44/02 |
| WO | WO-2012039668 | A1 | * | 3/2012 | ............ D21H 17/24 |
| WO | 2013/160553 | A1 | | 10/2013 | |
| WO | 2013160564 | A1 | | 10/2013 | |
| WO | 2015/044520 | A1 | | 4/2015 | |
| WO | WO-2015087293 | A1 | * | 6/2015 | ............ A61K 39/40 |
| WO | 2015125083 | A1 | | 8/2015 | |
| WO | 2015173474 | A1 | | 11/2015 | |
| WO | 2015181281 | A1 | | 12/2015 | |
| WO | WO-2015181281 | A1 | * | 12/2015 | ............... B32B 1/02 |
| WO | WO-2018069482 | A1 | * | 4/2018 | ............ B29C 44/02 |

OTHER PUBLICATIONS

Detzet et al. "Polyelectrolyte Multilayers in Tissue Engineering," Tissue Engineering, Part B, Vo. 17,. No. 2, pp. 101-113 (Year: 2011).*

Lisa Lundström "Polyelectrolyte multilayers of cationic and anionic starch and their use for improving the strength of papers made from mechanical pulps," Thesis, KTH Chemical Science and Engineering, Dept. of Fibre and Polymer Technology, Division of Fibre Technology, pp. 1-63. (Year: 2009).*

Au et al., in "Application of Wet-End Paper Chemistry" Second Edition, pp. 1-89, Chapters 3, 5 and 7-8. (Year: 2009).*

Office Action (Notice of Reasons for Refusal) dated Sep. 21, 2021, by the Japanese Patent Office in corresponding Japanese Patent Application No. 2019-552031 and an English Translation of the Office Action. (8 pages).

European Search Report, Application No. EP 17 16 2841, dated Jul. 7, 2017.

European Search Report, Application No. EP 17 16 2845, dated Jul. 7, 2017.

International Search Report (PCT/ISA/210) dated Nov. 23, 2017, by the European Patent Office as the International Searching Authority for International Application No. PCT/EP2017/076145.

* cited by examiner

METHOD OF MANUFACTURING OF A FOAM-FORMED CELLULOSIC FIBRE-MATERIAL, A BULK SHEET AND A LAMINATED PACKAGING MATERIAL COMPRISING THE CELLULOSIC FIBRE-MATERIAL

TECHNICAL FIELD

The present invention relates to a method of manufacturing a new foam-formed cellulosic fibre-material. The invention also relates to a new foam-formed cellulosic fibre-material as well as to a bulk sheet and a laminated packaging material comprising the form-foamed cellulosic fibre-material.

BACKGROUND ART

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, which are sold for long term ambient storage. The packaging material in this known packaging container is typically a laminate comprising a bulk layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the food contents of a container produced from the laminate, there is an innermost layer, applied onto the aluminium foil, which innermost, inside layer may be composed of one or several part layers, comprising heat sealable thermoplastic polymers, such as adhesive polymers and/or polyolefins. Also on the outside of the bulk layer, there is an outermost heat sealable polymer layer.

The packaging containers are generally produced by means of modern, high-speed packaging machines of the type that form, fill and seal packages from a web or from prefabricated blanks of packaging material. Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic or cuboid, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean conditions such that the filled package may be stored for a long time even at ambient temperature, without the risk of growth of microorganisms in the filled product. Another important advantage of the Tetra Brik®-type packaging method is, as stated above, the possibility of continuous high-speed packaging, which has considerable impact on cost efficiency.

Packaging containers for sensitive liquid food, for example milk or juice, can also be produced from sheet-like blanks or prefabricated blanks of a laminated packaging material. From a tubular blank of a packaging laminate that is folded flat, packages are produced by first of all building the blank up to form an open tubular container capsule, of which one open end is closed off by means of folding and heat-sealing of integral end panels. The thus closed container capsule is filled with the food product in question, e.g. juice, through its open end, which is thereafter closed off by means of further folding and heat-sealing of corresponding integral end panels. An example of a packaging container produced from sheet-like and tubular blanks is the conventional so-called gable-top package. There are also packages of this type which have a moulded top and/or screw cap made of plastic.

The layer of an aluminium foil in the packaging laminate provides gas barrier properties quite superior to most polymeric gas barrier materials. The conventional aluminium-foil based packaging laminate for liquid food aseptic packaging is still the most cost-efficient packaging material, at its level of performance, available on the market today.

Decreasing the costs of today's packaging material further, can be made by down-gauging the thickness of the polymer layers or by seeking to replace the aluminium foil barrier by one or more different barrier layers.

A way of saving costs, which has hitherto not been seen as practical in the field of liquid carton packaging, could be by down-gauging the cellulose-based bulk layer by type and/or amount of cellulose fibre material. Normally, it would lead to the important properties of mechanical strength and packaging integrity, as well as material barrier properties, being jeopardized and has thus previously been considered as a less favourable way forward. The paperboard is a major component of liquid carton packaging material, however also representing a major part of the total packaging material costs.

In a published International patent application No. WO2015/181281 by the present Applicant, a low density material of fibrous cellulose was incorporated into a laminated packaging material for similar packaging purposes as described above. It was seen that such a material would provide the necessary criteria of a bulk layer for laminated sandwich materials, including sufficient delamination strength of the material, as determined by the Huygen Internal Bonding Energy testing device in accordance with TAPPI T569.

However, there is a need to provide such materials with further improved mechanical properties, in particular delamination strength while at the same time the density of the material is not increased.

It is an object of the invention to at least partly overcome one or more of the above-identified limitations of the prior art. It is a further object to provide such a material also having improved z-directional compression strength, or compression resistance, i.e. reduced residual strain.

SUMMARY OF THE INVENTION

According to a first aspect of the invention, the above and other objects of the invention are achieved, in full or in part, by a method as defined by claim 1. According to this claim the above object is achieved by a method for manufacturing a foam-formed cellulosic fibre-material comprising the steps of providing an aqueous foam comprising a gas dispersed as bubbles in an aqueous phase, wherein said aqueous phase comprises a surfactant; adding cellulose fibres to the aqueous foam composition, thus forming a fibrous foam composition, wherein the cellulose fibres are added as coarse cellulosic fibres and a cellulose reinforcement fraction; distributing the fibrous foam composition onto a substrate or into a mould; and reducing the amount of water in the distributed fibrous foam composition to obtain the foam-formed cellulosic fibre-material in its final shape. In some instances the foam-formed cellulosic fibre-material in its final shape is referred to as board. Different chemicals are usually used in the paper industry, normally called strengthening agents or aids. The term cellulose reinforcement fraction encompasses strengthening aids, based on cellulose fibres such as modified cellulose fibres or refined cellulose fibres. The resulting foam-formed cellulosic fibre-material has a low density, typically below 450 kg/m$^3$. Further, the resulting foam-formed cellulosic fibre-material has a relatively high delamination strength, typically at least 100 J/m$^2$, preferably at least 140 J/m$^2$ and even more preferred at least 170 J/m$^2$.

The coarse cellulosic fibres are added in an amount of 85% to 97%, by weight of the total amount of cellulose fibres. The coarse cellulosic fibres may have a Canadian Standard Freeness (CSF) value of 400-750 mL. The coarse cellulosic fibres may have an average fibre length (length weighted) of 1.3 to 2.6 mm. The coarse cellulosic fibres may have an average fibre diameter of 20 to 45 μm. The coarse cellulosic fibres may have a fines content of less than 30%. The term "coarse" in "coarse cellulosic fibres is to be understood as that the pulp fibres have intact, un-collapsed fibre walls, such that they are more stiff and longer than fibres refined to lower freeness or fibres from which the lignin has been partially removed by chemical processes. Thus, coarse fibres are fibres with a fibre wall that is thick enough to withstand the forces applied to the fibres during pressing- and drying processes of paper/web making, otherwise causing the fibres to collapse. Chemical pulps where lignin has been partially removed will have a weaker fibre wall (due to the removal of the lignin) and will collapse during the papermaking process (pressing and drying). Fibres that still contain a sufficient amount of lignin will be able to withstand the process forces and will not collapse, unless they are refined such that the fibre walls have become weaker. In the resulting foam-formed cellulosic fibre-material, the coarse cellulosic fibres functions as a component giving the material its bulky structure. The coarse cellulosic fibres may be selected from the group consisting of mechanical, chemi-mechanical, thermomechanical, chemi-thermomechanical pulp (CTMP) fibres and Neutral Sulfite Semi Chemical (NSSC) chemical pulp fibres. The mechanical, chemi-mechanical, thermomechanical, chemithermomechanical pulp or NSSC chemical fibres may be chosen from the group consisting of groundwood (GW), stone ground wood (SGW), pressure groundwood (PGW), thermomechanical pulp (TMP), high-temperature thermomechanical pulp (HTMP), chemi-mechanical pulp fibres (CMP), CTMP or NSSC pulp fibres. Preferably, the coarse cellulosic fibres are chemithermo-mechanical CTMP pulp fibres. The CTMP are added in an amount of 85% to 97%, by weight of the total amount of cellulose fibres. The CTMP may have a CSF value of 400-750 mL. The CTMP may have an average fibre length (length weighted) of 1.3 to 2.6 mm. The CTMP may have an average fibre diameter of 20 to 45 μm. The CTMP may have a fines content of less than 30%. According to one embodiment, the CTMP are added in an amount of 85% to 97%, by weight of the total amount of cellulose fibres, and has a CSF value of 400-750 mL, an average fibre length (length weighted) of 1.3 to 2.6 mm, an average fibre diameter of 20 to 45 μm, and a fines content of less than 30%.

The cellulose reinforcement fraction is added in an amount of 3% to 15%, by weight of the total amount of cellulose fibres. The cellulose reinforcement fraction is a heavily refined fibre component, also called, and being the same as, a highly refined fibre component. In the resulting foam-formed cellulosic fibre-material, the cellulose reinforcement fraction functions as a reinforcement that facilitates the binding of the cellulosic fibres in subsequent stages of the papermaking process and compensates for the strength loss caused by the low density structure. Moreover, if well retained, the cellulose reinforcement fraction increases the bonding sites and the retention of starch. The cellulose reinforcement fraction may have an average fibre length of approximately 0.4 to 0.8 mm, preferably 0.5-0.7 mm, more preferred 0.6-0.65 mm. The cellulose reinforcement fraction may have an average fibre diameter of approximately 20 to 30 μm. The cellulose reinforcement fraction may have a fines (defined as the fraction passing through 200 mesh wire) content below 30%. The cellulose reinforcement fraction may be produced e.g. with a conventional LC-refiner (Low Consistency refiner). The filtration resistance of the cellulose reinforcement fraction measured with the Schopper-Riegler method may be higher than 80 SR, such as 85-95 SR. The cellulose reinforcement fraction is thus larger in dimensions than NFC (nanofibrillated cellulose) or MFC (microfibrillated cellulose), of which the latter has an average fibre length of 100 nm to 0.1 mm and fibre diameter of 3 to 50 nm. The cellulose reinforcement fraction increases the strength of the fibre network because it is highly fibrillated and has therefore large specific surface area and consequently a high number of hydroxyl groups that form the hydrogen bonds between the fibre furnish components. Still, the heavily refined fibres are still parts of fibres, and not reduced to fibrillar cellulose that are of a much smaller size, i.e. on the micro- and/or nanometer scale. The term "fibrillar cellulose" does not encompass "cellulose fines". "Fines" are not equal to "fibrils". Fibrils have a significantly smaller size than fines.

Preferably, the coarse cellulosic fibres is added in an amount of 85-97%, by weight of the total amount of cellulose fibres and the cellulose reinforcement fraction is added in an amount of 3-15%, by weight of the total amount of cellulose fibres.

The first step in producing a foam-formed cellulosic fibre-material involves providing foam comprising cellulose fibres. Such foam may be produced by mixing cellulose fibres and a foaming fluid comprising a liquid and a surfactant. The liquid may be water. Typically, the amount of the surfactant may be from 0.01 to 1000 ppm (weight to weight), such as from 0.01 to 100 ppm, such as from 0.01 to 10 ppm, such as from 0.05 to 10 ppm, such as from 0.1 to 8 ppm.

A rotor mixer or a general foam-generator may be used to generate foam comprising cellulosic fibres. The foam may generally be formed by bringing a gas into the mixture. Air is one example of an appropriate gas. Other suitable gases are oxygen and nitrogen. The gas may be brought into the mixture in the form of pressurized gas and by the vortex caused by stirring.

The fibrous foam composition may be distributed into a mould and subsequently dewatered and dried to obtain a final three-dimensional shape. In this way, due to the improved internal bond strength, i.e. delamination strength, it is possible to produce a three-dimensional article by moulding the aqueous fibrous foam composition without the addition of large amounts of further additives or polymers, for the purpose of internal bonding strength.

The step of reducing the amount of water in the distributed fibrous composition may include dewatering and/or drying. The substrate onto which the fibrous foam composition is distributed may be a wire form or a forming wire. Distribution onto wire form or a forming wire represents one way of dewatering the fibrous foam. After initial dewatering on a forming wire, the foam-formed cellulosic fibre-material (the fibrous web) may be compressed mechanically, in one or several consecutive wet press nips. Subsequently, the resulting dewatered the foam-formed cellulosic fibre-material (the fibrous web) may be dried, using any conventional drying method, such as cylinder drying, impingement drying or Condebelt drying, alternatively equipped with IR (infra red) dryers, to a final moisture content between 0 to 15% (weight/weight).

Compared to traditional paper manufacturing, additional or modified drying may suitably be used in order to achieve the desired dryness and density.

Generally, the cellulose fibres are provided as a liquid dispersion comprising cellulose fibres (a fibre dispersion). The concentration of the cellulose fibres in the liquid dispersion comprising cellulose fibres may be 0.1% to 10% (weight/weight). The liquid dispersion comprising cellulose fibres may be an aqueous dispersion comprising cellulose fibres.

The fibre dispersion may be added to the foaming fluid after foam has been generated from the fluid (including the surfactant).

Alternatively, the liquid dispersion comprising cellulosic fibres may be combined with the foaming fluid prior to foaming.

The total amount of fibres in the fibrous foam composition may be from 0.1 to 10 wt % (weight/weight), such as from 0.1 to 7 wt %, such as from 0.1 to 5, such as from 0.5 to 5, such as from 0.5 to 4, such as from 0.5 to 3 wt %, based on the total wet foam composition.

If necessary, an additive for controlling the consistency of the foam may be added.

According to one embodiment, the cellulose reinforcement fraction is a heavily refined fibre component chosen from heavily refined chemical pulp having a Schopper-Riegler (SR) number range higher than SR°80, such as SR°90, and heavily refined chemithermomechanical pulp (hrCTMP) having a CSF less than 70 mL. The heavily refined chemical pulp may have a Schopper-Riegler (SR) number of SR°90. According to an embodiment, the heavily/highly refined pulp may be a pulp selected from sulphite or sulphate (chemical) pulp, as above, and based on hardwood or softwood, heavily refined CTMP pulp as above, or heavily refined NSSC pulp. The heavily refined chemical pulp may be heavily refined sulphite pulp, heavily refined softwood pulp, heavily refined kraft (sulphate) pulp or heavily refined hardwood pulp (hrHW). In one embodiment the heavily refined reinforcement pulp is hrHW. The hrHW may have a Schopper-Riegler (SR) number of SR°90. One advantage of using hrHW is that hardwood pulp is commercially well available. The hrCTMP may have a CSF value of less than 70 mL. Using hr-fibres has the advantage that it increases the bonded area and therefore produces higher sheet strength.

The foam-formed cellulosic fibre-material of the invention may further comprise additive amounts (such as below 10 wt %) of other materials, such as strength chemicals or agents, such as starch and derivatives thereof, or carboxymethyl cellulose and derivatives thereof. Such additives may be added to influence the properties of the resulting foam-formed cellulosic fibre-material. Cationic starch may be added in order to further increase the sheet strength. Cationic starch may be added at less than 6 wt % of the cellulose composition, preferably at from 0.5 to 5.5 wt %, such as from 1 to 5 wt %, such as from 1.5 to 4 wt %, such as from 2 to 5 wt %.

According to another embodiment, the cellulose reinforcement fraction has been treated with a cationic dry strength agent. Such treatment increases bonded area in the fibre network and thereby improves the strength. The cationic dry strength agent may be chosen from the group consisting of cationic starch (CS), cationic polyacrylamide (CPAM) and glyoxalated polyacrylamide (GPAM). Other respective cationic agents may also be used, such as polyaminoamid-epichlorohydrine (PAE). Preferably, the cellulose reinforcement fraction has been treated with cationic starch as a cationic dry strength agent.

The treatment of the cellulose reinforcement fraction with a cationic strength agent may have been performed before a step of mixing the coarse cellulosic fibres and the cellulose reinforcement fraction to form a cellulose fibre mixture.

Alternatively, instead of treating the cellulose reinforcement fraction with a cationic dry strength agent, the whole cellulose fibre-mixture may be treated with a cationic dry strength agent.

According to a further embodiment, the cellulose reinforcement fraction has been treated with polyelectrolyte multilayering method (PEM), resulting in three polymer layers, wherein a first polymer layer on the cellulose reinforcement fraction is cationic polymer, such as cationic starch (CS); a second polymer layer on the cellulose reinforcement fraction is anionic polymer, such as carboxy methyl cellulose (CMC), anionic starch (AS) and anionic polyacrylamide (APAM); and wherein a third polymer layer on the cellulose reinforcement fraction is cationic polymer, such as cationic starch (CS). Layering may be continued up to six layers, or may be stopped after the first two completed layers. Treating the cellulose reinforcement fraction with PEM has the advantage that high amount of polyelectrolytes can be absorbed on the fibre material surfaces with high retention by forming a relatively thick gel-like layer on the surface of fibre allowing the fibres to efficiently bond together during drying.

The treatment of the cellulose reinforcement fraction with polyelectrolyte multilayering method (PEM) may have been performed before the step of mixing the coarse cellulosic fibres and the cellulose reinforcement fraction to form a cellulose fibre mixture.

Alternatively, instead of treating the cellulose reinforcement fraction with polyelectrolyte multilayering method (PEM), the whole cellulose fibre-mixture may be treated with polyelectrolyte multilayering method (PEM).

According to another embodiment, the method further comprises the step of mixing the coarse cellulosic fibres and the cellulose reinforcement fraction to form a cellulose fibre mixture; wherein the step of mixing is performed before the step of adding cellulose fibres to the aqueous foam composition. This has the advantage that it is an efficient method to prepare a homogenous fibre mix.

Alternatively, the method further comprises the step of mixing the coarse cellulosic fibres and the heavily refined fibre component to form a cellulose fibre mixture; wherein the step of mixing is performed before the step of adding cellulose fibres to the aqueous foam composition; and wherein the whole cellulose fibre-mixture has been treated after the step of mixing the coarse cellulosic fibres and the cellulose reinforcement fraction to form a cellulose fibre mixture.

According to a further embodiment, the surfactant is sodium dodecyl sulphate (SDS) (also called sodium lauryl sulphate (SLS)) or sodium lauryl ether sulfate (SLES). The amount of the surfactant may be from 0.05 to 10 g/l of liquid, such as from 0.1 to 8 g/l of liquid.

Preferably, the surfactant is sodium dodecyl sulphate (SDS).

Preferably, the amount of SDS is from 0.05 to 10 g/l of liquid, such as from 0.1 to 8 g/l of liquid.

SDS is an anionic surfactant, i.e. it has a negative charge in an aqueous environment. Furthermore, SDS is an efficient and inexpensive surfactant and is widely used in numerous health-safe applications like shampoos and toothpaste, which require a non-toxic surfactant. In addition, SDS is a very efficient foaming agent and thus the required SDS concentration in pulp suspension to form an acceptable foam is low. The required concentration of nonionic surfactants is typically 10 times higher than the required concentration of SDS. Cationic surfactants adsorb to the anionic sites on fibres and thus their concentration in the web is increased, resulting in a product having a higher surfactant content and a decreased strength. The amount of polyvinyl alcohol (PVA) required to form foam is known to be much higher compared to SDS and thus the amount of surfactant that goes out of the board-making process to the water purification plant will be much higher with PVA. Further, the strength of the product when PVA is used as foaming agent may depend on foaming agent concentration which can cause challenges in the control of product quality if foaming is adjusted with PVA. In addition, the concentration of PVA also affects the strength properties of the resulting material.

SDS is negatively charged which effects cationic process chemicals, e.g. CPAM (cationic polyacrylamide) (retention chemical), cationic starch (dry strength agent) and AKD (alkyl ketene dimer) (sizing agent) (dispersion stabilized typically with cationic polymers). Each of these problems may be independently solved as discussed herein.

When SDS is used as surfactant and the cationic dry strength agent is cationic starch, some unwanted effects for cationic additives might arise. In the air bubble, the anionic SDS molecule is aligned so that the anionic end (i.e. the hydrophilic end) is towards the water phase and hydrophobic end is towards the air phase. Therefore, the air bubbles in the foam have a large surface area with a high negative surface charge. The anionic bubble surface might "compete" with fibres for the adsorption of cationic strengthening aids and cationic retention polymers. Also anionic air bubbles could probably detach cationic polymers that are already adsorbed on the fibre surfaces, particularly if high shear forces exist in the process. Therefore, detrimental effects depend on the delay times in foam, i.e. how long time the cationic strengthening aids and cationic retention polymers are present in the foam, i.e. interacting with the foam. In order to overcome this problem, cationic starch may be added into thick stock (i.e the fibre dispersion or the cellulose fibre mixture) before mixing foam with thick stock. Then SDS does not disturb adsorption of cationic starch onto fibres. The delay time in foam should be short because some extent of desorption occurs in foam. High foam density (600 kg/m$^3$-750 kg/m$^3$) promotes cationic starch retention, when compared to lower foam densities. Alternatively, cationic starch may be added into foam at foam density 600 kg/m$^3$-750 kg/m$^3$. Retention system and dosing manner may be as described below. Retention may be increased by good solids retention with increased dosage of CPAM and microparticle as retentions chemicals. Instead of using CPAM and microparticle, a retention system consisting of tannic acid (TA) and polyethyleneoxide (PEO) may be employed.

According to another embodiment, the method further comprises the step of adding a retention system to the fibrous foam composition obtained in the step of adding cellulose fibres to the aqueous foam composition. The retention system may comprise polyethylene oxide (PEO) and tannic acid (TA). Adding a retention system has the effect that less fibres and particles leave the material during the step of reducing the amount of water in the material as they are retained in the material. This increases the quality of the resulting material: as the non-retained material is mostly small by dimensions and well-bonding, its contribution to bonding is significant. In addition, dewatering and the retention of other chemicals are also improved, resulting in savings in raw material and production costs.

In a two-component retention system the additions are preferably made into pipe-line in two separate insertion points with a clear time delay between the points.

The retention system may comprise polyethylene oxide (PEO) and tannic acid (TA). Polyethylene oxide (PEO) and tannic acid (TA) are preferably added in amounts smaller than 450 g/t of dry solids. Polyethylene oxide (PEO) and tannic acid (TA) is a nonionic retention system and thus no interfering interactions occur between opposite charges on an anionic foaming agent such as SDS and the retention system. Preferably the PEO has a molecular weight (MW) of $6\times10^6$ to $8\times10^6$.

Thus, when the surfactant is an anionic surfactant, e.g. SDS, the preferred retentions system is polyethylene oxide (PEO) and tannic acid (TA). Polyethylene oxide (PEO) and tannic acid (TA) are preferably added in amounts smaller than 450 g/t of dry solids.

Instead of tannic acid, any compound containing phenolic groups, e.g. kraft lignin or formaldehyde resin may be used.

Alternatively, the retention system may be a combination of cationic polyacrylamide (CPAM) and microparticles, The latter may have a negative electrostatic charge and a very high surface area. The microparticles may be either polymeric or inorganic or a combination thereof. One example of inorganic microparticles used is bentonite. Preferably, CPAM may be added in an amount smaller than 1000 g/t of dry solids content. Preferably, the microparticles are added in an amount smaller than 1000 g/t of dry solids content. Addition of CPAM and microparticles has the advantage that it improves the solids retention. When using SDS as the foaming agent and CPAM and microparticles as the retention system, cationic charge of CPAM interacts with foamed SDS and thus the effectivity of the retention system decreases. To overcome this problem, an increased amount of CPAM (400 g/t-1000 g/t) may be fed into the head-box feed line before microparticle addition when the foam density is 600 kg/m$^3$-750 kg/m$^3$. Alternatively, to reduce the negative effect described above, CPAM may be fed into the thick stock (i.e the fibre dispersion or the cellulose fibre mixture) before mixing foam with thick stock and feeding micro-particles close to head-box into head-box feeding line.

No further addition of polymers or fibres to the fibrous foam composition is needed in order to enable usage of the obtained foam-formed cellulosic fibre-material for bulk materials in liquid carton packaging materials and laminates.

Sizing agent(s), such as alkyl succinic anhydride (ASA), alkyl ketene dimer (AKD) and rosin, may be added to the fibrous foam composition to improve the board's (i.e. the foam-formed cellulosic fibre-material) hydrophobicity and thereby its water repelling properties. The sizing agent(s) may be added to the fibrous foam composition in amounts up to 4 kg/tonne of dry solids content. In the production of liquid packaging board, the internal sizing is usually done by adding AKD (alkylketene dimer).

According to one embodiment, the method further comprises the step of performing hydrophobic sizing by adding alkylketene dimer (AKD), alkyl succinic anhydride (ASA) and/or rosin sizing directly before the step of distributing the fibrous foam composition onto a substrate or into a mould. Preferably, alkylketene dimer (AKD), alkyl succinic anhydride (ASA) and/or rosin sizing is added less than 20 seconds, preferably less than 10 seconds, such as 7 seconds, before the step of distributing the fibrous foam composition onto a substrate or into a mould. With AKD the dose may be 4 kg/t or less of dry solids content. One advantage of adding the sizing agent at this stage is that the sizing agent has good performance. If added earlier, the surfactant may wash away the sizing agent, resulting in lower hydrophobicity and thus increasing the tendency of the resulting material to absorb liquid when dry. Preferably, the sizing agent(s) is/are added in a total amount of no more than 4 kg/t of dry solids content.

AKD, such as Fennosize KD364M, dosed at 4 kg/tonne of dry solids content (active substance) or less may be added to the foam as closely as possible before the step of distributing the fibrous foam composition onto a substrate or into a mould. Preferably, AKD is added less than 20 seconds, preferably less than 10 seconds, such as 7 seconds, before the step of distributing the fibrous foam composition onto a substrate or into a mould. This sizing agent works efficiently in SDS foam-forming.

Surfactants are known to disturb AKD-sizing. When using SDS as the foaming agent and AKD as the sizing agent the negative charge of SDS probably neutralizes cationically stabilized AKD. Thus, SDS interferes with adsorption of AKD particles onto fibre surfaces. Moreover, the AKD-product has to be compatible to the whole foam forming chemistry. For these reasons, AKD-product has to be selected carefully. The retention system (CPAM and microparticles) as well as cationic starch addition promotes sizing and together with Fennosize KD 364 AKD-product the sufficient sizing level may be achieved. The reason for the compatibility of Fennosize KD 364 and foam forming chemistry could be the proportionally high cationic charge in the stabilization system of AKD.

Preferably, since AKD-delay, i.e. residence time of AKD, in the foam may decrease efficiency of sizing, the sizing agent is fed into the foam just before the head box.

According to an alternative embodiment, the method further comprises the step of performing hydrophobic sizing by applying sizing agent by spraying it on the distributed fibrous foam composition obtained in the step of distributing the fibrous foam composition onto a substrate or into a mould, wherein the sizing agent comprises alkylketene dimer (AKD) and/or alkyl succinic anhydride (ASA), and/or rosin. Preferably the sizing agent(s) is/are added in a total amount of no more than 4 kg/t of dry solids content. One advantage of adding the sizing agent as a spray is that it further minimizes the AKD washing-out effect of the surfactant by further reducing shear forces and exposure time to the shear.

According to one embodiment, the density of the fibrous foam composition to be reduced from an amount of water is approximately 600 to 750 kg/m$^3$. The average bubble size may be 100 µm or below. Thus, before the amount of water has been reduced in step (d), the density of the fibrous foam composition is approximately 600-750 kg/m$^3$. This has the advantage that at this density the SDS content does not interact too much with the cationic chemicals, ensuring target level strength properties for board. At the same time the foam quality is good enough to produce acceptable formation. After the amount of water has been reduced (step (d)), the foam-formed cellulosic fibre-material has obtained its final shape and contains no or negligible amount of foam. After the amount of water has been reduced, the density of the foam-formed cellulosic fibre-material (the board) preferably is 450 kg/m$^3$ or less, preferably 250-350 kg/m$^3$, such as 300 kg/m$^3$.

According to another embodiment, the average bubble size of the fibrous foam composition is 100 µm or below, such 80 µm or below, such as 60 µm or below. This has the advantage that bubbles keep individual fibres separated and thereby fibre flocs are not generated, leading to good formation of the material typically having a specific formation, i.e. formation number or the standard deviation of the local grammage normalised with the grammage, measured according to SCAN-P 92:09 below 1.0 √g/m. The bubble radius may be determined as Sauter mean diameter D [3, 2], using optical measurement and averaging the diameter of measured bubbles.

The foam comprising cellulosic fibres generated as described above may be run through a nozzle arrangement ("headbox") where pressure and forming tools generate a web of foam-formed cellulosic fibre-material. Headbox nozzle distributes the fibre foam evenly in cross-direction on a forming wire and subsequent dewatering elements increase the solids content, typically to 15 to 20% (weight/weight) after the forming section. After this, the web may be mechanically compressed to reach solids content level of 30 to 55%. To reach the final solids content target (typically 85 to 95%) the web may be dried by using drying units such as hot cylinders, infra-red dryers or Condebelt dryer. Finally, base board may be rolled onto a reel, wound to customer-width reels and stored, before future use to prepare for example a packaging material.

Optionally, the foam-formed cellulosic fibre-material is used in-line, i.e. directly applying additional layers in order to transform the foam-formed cellulose web to a laminated packaging material for liquid or semi-liquid food packaging.

According to a second aspect of the invention, a foam-formed cellulosic fibre-material is also provided. The foam-formed cellulosic fibre-material comprises coarse cellulosic fibres in an amount of 85% to 97%, by weight of the total amount of cellulose fibres and a cellulose reinforcement fraction in an amount of 3% to 15%, by weight of the total amount of cellulose fibres. The foam-formed cellulosic fibre-material may have a density of 200 to 450 kg/m$^3$, preferably 250 to 350 kg/m$^3$, and even more preferred 300 to 320 kg/m$^3$. Since such a material comprises less cellulosic fibres than conventional material while still having the desired properties needed, the material costs are lower compared to when a conventional material is used for the same application.

The foam-formed cellulosic fibre-material according to the present invention has further improved internal bond strength, i.e. delamination strength, as compared to the corresponding foam-formed cellulose not comprising a heavily refined fibre pulp in its composition. In addition, it has also improved resistance to compression in thickness direction, i.e. reduced residual strain.

The foam-formed cellulosic fibre-material according to the present invention may be manufactured according to the method according to the present invention.

The present invention also relates to a foam-formed cellulosic fibre-material obtained by the method according to the present invention.

The foam-formed cellulosic fibre-material according to the present invention may be defined as having a density of at most 450 kg/m$^3$, a grammage of at least 20 g/m$^2$, an edge wicking index of lower than 1 kg/m$^2$, such as 0.5 kg/m$^2$ or lower, a delamination strength of at least 100 J/m$^2$, a compression strength ratio MD/CD between 1.3 and 4.0, preferably between 2.0 and 3.5, even more preferred between 2.5 and 3.0, a z-strength of at least 150 kPa, and a residual strain (i.e. remaining thickness reduction after z-directional compression) of 3 to 8% with a single loading of 2 MPa.

The foam-formed cellulosic fibre-material according to the present invention is thermally stable above 300° C. and has a low heat transfer, as opposed to foamed polymer layers in general. It has been observed that at relatively low densities of from 200 to 450 kg/m$^3$, a foam-formed cellulosic fibre-material sheet does not lose too much of its original thickness in extrusion lamination operations (low residual strain), and also sufficiently maintains its initial delamination strength, as well as its tensile strength in z-direction, i.e. z-strength (z-directional tensile strength).

The foam-formed cellulosic fibre-material may have a grammage of at least 20 g/m$^2$. In some embodiments the grammage is between 20 and 440 g/m$^2$.

According to one embodiment, the foam-formed cellulosic fibre-material has a delamination strength of at least 100 J/m$^2$, preferably at least 140 J/m$^2$ and even more preferred at least 170 J/m$^2$. The delamination strength may be 60-300 J/m$^2$, such as 60-250 J/m$^2$, such as 80-220 J/m$^2$, such as 140-220 J/m$^2$, such as 170-220 J/m$^2$. These values are comparable to the values for conventional materials used in e.g. packaging materials.

According to another embodiment, the foam-formed cellulosic fibre-material has a density of at most 450 kg/m$^3$. Preferably, the density is 250-350 kg/m$^3$, such as 300 kg/m$^3$, such as 200 kg/m$^3$.

According to yet another embodiment, the foam-formed cellulosic fibre-material has a compression strength ratio MD/CD between 1.3 and 4.0, preferably between 2.0 and 3.5, and even more preferred between 2.5 and 3.0.

According to a third aspect of the invention, a cellulose bulk sheet for a packaging material is also provided. The cellulose bulk sheet comprises the foam-formed cellulosic fibre-material according the invention, laminated or arranged in layer contact with a further sheet of a different cellulose material. Such a bulk sheet has the advantage acting as a core in a sandwich material construction and its higher thickness provides the sandwich composite with high bending stiffness with overall low density, i.e. a high stiffness-to-weight ratio. Further, the bulk layer is structurally strong enough to keep the flanges/skins in their relative positions under out-of-plane loading, i.e. under compression in z-direction, exhibiting low residual strain.

According to one embodiment, the further sheet of a different cellulose material is a paper. Since the further sheet is thinner and stiffer, it can act as a flange/skin in a sandwich composite that carries in-plane compression and tension loads.

The bulk layer or the foam-formed cellulosic fibre-material may have a surface weight grammage of at least 20 g/m$^2$. In some embodiments the grammage is between 20 and 440 g/m$^2$.

According to a fourth aspect of the invention, a laminated packaging material comprising the foam-formed cellulosic fibre-material according to the invention is provided, wherein the foam-formed cellulosic fibre-material is laminated to at least one layer of polymer, such as a thermoplastic polymer, such as a polyolefin.

Laminated packaging materials may be obtained by various methods for laminating layers together, such as extrusion lamination, wet or dry adhesive lamination, heat-pressure lamination, and may also be including various coating methods.

Although the particular lamination technique is not crucial in order to achieve the benefits described herein. Extrusion lamination is one example which may suitably be used to produce laminated packaging materials, in particular carton-based packages used for food such as liquid and semi-liquid food.

According to one embodiment, the laminated packaging material further comprises an oxygen barrier. This has the advantage that a package made from the packaging material can be used to package goods that are sensitive to oxygen.

The oxygen barrier layer may be an aluminium foil. Typically, the thickness of the aluminum foil is 3-15 μm, such as 5-10 μm, such as 5-8 μm.

Alternatively, the barrier layer is barrier film or coating.

The delamination strength of the packaging material may be 60-300 J/m$^2$, such as 60-250 J/m$^2$, such as 80-220 J/m$^2$, such as 140-220 J/m$^2$, such as 170-220 J/m$^2$.

In particular, a laminated packaging material according to the invention comprises a bulk layer, comprising a material from a foam-formed cellulosic fibre-material, also called foamed cellulose. The bulk material layer can be arranged to provide for the most efficient contribution to the flexural rigidity of a laminate. The bulk layer may thus be appropriately selected in order to obtain the desired stiffness suitable for the type of packaging container and the intended food product.

A bulk layer comprising foam-formed cellulosic fibre-material according to the present invention provides necessary delamination strength in combination with compression strength in the thickness direction, which provides sufficient distance between a barrier layer and an outermost thermoplastic layer of the packaging material.

A suitable bulk may thus comprise mainly or only the foam-formed cellulosic fibre-material, and accordingly has approximately, or exactly the same physical properties as the foam-formed cellulosic fibre-material according to the invention.

The bulk layer may further comprise an additional, integrated, flange or facing layer of a cellulose-based material, such as a thin paper, having higher tensile stiffness and a higher density, in order to provide sandwich constructional features within the bulk layer itself.

Thus, the layer of foam-formed cellulosic fibre-material may be laminated or arranged to be in contiguous layer contact with at least one facing paper layer, within the bulk layer.

The final laminated packaging material may comprise a bulk layer of the foam-formed cellulosic fibre-material and at least one additional, different cellulose material layer, such as a thin paper or a downgauged paperboard facing layer, the layers being laminated by subsequent lamination operations in the manufacturing of the laminated packaging material.

A multilayered bulk layer may be a laminate of individual layers produced independently and subsequently attached to each other.

Alternatively, a multilayered bulk may be formed already in the paper manufacturing machine. For example, a layer of foam-formed cellulosic fibre-material can be formed by one headbox (a nozzle arrangement), while another paper layer, or layer from different cellulose fibres, may be formed by another headbox in the same machine. The use of multiple headboxes in the same paper machine is well known in the field of paper making. It is also possible to use a stratified head box to form the layers of a multilayered product.

The bulk layer or the foam-formed cellulosic fibre-material according to the invention may have a surface weight grammage of at least 20 g/m$^2$. In some embodiments the grammage is from 20 to 440 g/m$^2$, such as from 25 to 350 g/m$^2$, such as from 45 to 250 g/m$^2$, such as from 60 to 220 g/m$^2$, such as from 60 to 200 g/m$^2$.

For some applications, the optimal density of foam-formed cellulosic fibre-material to be used in laminated packaging materials is from 200 to 450 kg/m$^3$, in particular from 200 to 400 kg/m$^3$, such as from 300 to 400 kg/m$^3$.

The bulk layer may have a thickness from 80 to 1100 μm, such as from 90 to 800 μm, such as from 150 to 600 μm, such as from 200 to 550 μm, such as from 250 to 350 μm.

The bulk layer may comprise the foam-formed cellulosic fibre-material as bulk material. The bulk layer may be characterized by a density less than 700 kg/m$^3$, such as from 100 to 600 kg/m$^3$, such as from 100 to 500 kg/m$^3$, such as from 200 to 500 kg/m$^3$, such as from 300 to 500 kg/m$^3$, such as from 300 to 400 kg/m$^3$, such as from 200 to 400 kg/m$^3$, such as from 200 to 300 kg/m$^3$.

The foam-formed cellulosic fibre-material may provide at least 20%, such as at least 25% such as at least 30%, such as at least 40% of the thickness of the bulk layer. The percentages may be determined by examining the cross-section of the packaging material in a microscope.

The bulk layer may be comprised of foam-formed cellulosic fibre-material, thus not really constituting in itself a bulk layer, but rather a spacer layer for a final laminate or sandwich configuration, and the bulk spacer layer may have a density less than 450 kg/m$^3$, preferably 200-300 kg/m$^3$.

The lower the density of the foam-formed cellulose bulk material, the higher cost-efficiency regarding raw materials consumed. Better resistance to thickness reduction properties of a foam-formed cellulose is obtained at above 300 kg/m$^3$.

The bulk layer, which includes a foam-formed cellulosic fibre-material layer and optionally an additional cellulose layer, may be provided with coatings such as for example clay coating, or may be surface modified. Such coatings or surface modifications may also be suitable for application to an additional layer, which is for example intended for printing, and arranged between the bulk layer (optionally including an additional cellulose layer) and the outermost heat sealable polymer layer. The bulk layer, optionally including an additional layer, such as a thin paper facing layer, can be surface modified or there may be an adhesive or binding layer in order to facilitate the compatibility and bonding between the bulk layer and additional layers.

The bulk layer may be surface-treated or surface-coated in order to improve adhesion and compatibility between surrounding layers of the packaging laminate, and/or to obtain additional desired properties such as improved stiffness.

Such surface treatment may be provided by means of exposure of the material surface to corona, ozone or flame treatments, or the like.

A laminated packaging material according to the invention may comprise a bulk layer comprising the foam-formed cellulosic fibre-material according to the invention, and at least one thermoplastic material layer laminated thereto. The thermoplastic layer may be covering and protecting the cellulose-based bulk layer and may constitute an outer heat-sealable side of the laminated packaging material.

The side of the bulk layer which is to become the outer side of the closed and sealed packaging container may be printed with a decorative ink pattern, and subsequently coated by a thermoplastic, outer, liquid-tight and heat sealable layer.

The bulk layer may thus provide an opportunity to incorporate a foam-formed cellulosic fibre-material into a laminated packaging material suitable for preparing packaging containers for food products, especially for liquid and semi-liquid food products.

Lamination of the bulk layer and the bulk material of foam-formed cellulosic fibre-material to polymer layers may be carried out by melt extrusion operations, like extrusion coating and extrusion lamination of the plastic layers. The extrusion may generally be performed at high temperatures such as, in the case of low density polyethylenes, up to about 330° C. Such temperatures have been shown not to become a major problem for a bulk layer comprising the foam-formed cellulosic fibre-material according to the present invention. This is in contrast to the case of bulk layers of foamed polymer layers, for which it has been shown that the polymer core collapses during extrusion coating, see WO2015/181281.

The bulk layer may provide a distance between a barrier layer and an outermost thermoplastic heat sealable polymer layer, and thereby enables tailor-made laminated packaging material structures.

The laminated packaging material may comprise an additional layer between the outermost thermoplastic layer and the bulk layer. The additional layer can for example be a paper or paperboard layer or a polymer film. The additional layer may contain a print on the side which is to become the outside of the packaging container. Whenever the additional layer is a paper, paperboard or cellulose layer, a grammage of at least 20 g/m$^2$ and in some embodiments between 20 and 100 g/m$^2$ are suitable. The paper layer may be coated with a white coating or clay coating layer to improve the whiteness of the surface. Whenever the additional layer is a polymer film its thickness preferably is 10-50 μm. Examples of suitable films are oriented pre-manufactured films such as BOPP (biaxially oriented polypropylene), BoPET (biaxially oriented polyethylene terephthalate), polyimide, and oriented high density polyethylene films.

The additional layer may be selected from a paper layer having a grammage of between 20 and 100 g/m$^2$ and a polymer film having a thickness of 10-50 μm.

The thickness of the outer layer of the packaging material, directed towards the outside of a package made from the material, may for example be 5 μm-50 μm, such as 7 μm-30 μm, such as 7 μm-20 μm, such as 8 μm-15 μm.

When the outermost thermoplastic layer is covering the decorative print pattern, it has to be transparent so that the printed decor is well visible to the outside of the package without being deteriorated by the plastic layer quality.

On the side of the bulk layer opposite the printed decor and hence facing the inside of the final packaging container, a barrier layer may be arranged, for example by means of an intermediate laminate layer which may be a polyolefin-based layer of for example HDPE, LDPE, polypropylene, or another suitable thermoplastic polymer layer such as ethylene-acrylic acid copolymer (EAA), which further facilitates adhesion between the bulk layer and the oxygen barrier.

Optionally, the bulk layer and/or the barrier layer is treated or modified in order to achieve adhesion between the layers, in which case the laminate layer may not be needed. For example, a coating which modifies the surface of one or more of the substrates may be used.

The laminate layer may be applied by an extrusion process using commercially available extrusion equipment. Materials suitable as laminate layer are known and conventionally comprise a polyolefin.

The laminating material may comprise a polyethylene or blends thereof. Within the group of polyethylenes, the properties of laminating layers can be varied and tailored in order to achieve various final properties in a packaging material. Variations of the laminate layer for the desired type of packaging material for liquid and semi-liquid foods are thus found largely within the group of polyethylene polymers.

The thickness of the laminate layer of the packaging material may be 5 μm-50 μm, such as 10 μm-30 μm, such as 15 μm-30 μm, such as 17 μm-25 μm.

The barrier layer, such as oxygen barrier layer (e.g. aluminium foil or a polymer film such as a vapour deposition coated thermoplastic film) may be arranged by means of the laminate layer on the side opposite the bulk layer.

The barrier layer may have an adhesive on the side opposite the optional laminate layer. The adhesive is within the capacity of those skilled in the art to select depending on desired properties and compatibility with the layer with which it is in contact.

When the barrier layer is aluminium foil an example of adhesive is ethylene copolymers with comonomers having carboxylic acid functionality such as ethylene acrylic acid copolymer, for example marketed under the tradename Primacor® by Dow or Nucrel® by Dupont.

The adhesive layer of the packaging material according to the invention may have a thickness of 3 μm-12 μm, such as 4 μm-10 μm such as 5 μm-9 μm. The adhesive layer may be characterized by different methods including for example infrared spectroscopy (IR).

The packaging material may further contain an innermost heat-sealable layer. An example of a heat-sealable layer is a heat-sealable polyolefin polymer which is applied as a layer to be directed towards the inside of the container, i.e. in direct food contact. The heat-sealable layer for the innermost layer may be a polyethylene polymer of the low density type, selected from the group consisting of LDPE, LLDPE, VLDPE, ULDPE or mLLDPE and blends of two or more thereof. The arrangement of the heat-sealable layer is similar to the laminate layer and what was disclosed above in connection with the laminate layer applies also to the heat-sealable innermost layer.

Depending on the type of packaging container produced from the packaging material, also heat-sealable innermost layers of high density polyethylene, polypropylene or propylene co- or ter-polymers are conceivable within the scope of the invention as long as they are compatible with and achieve the desired effect in combination with other components of the packaging material and in particular the adhesive as described herein.

Suitable examples to be used as innermost layers are blends between LDPE and mLLDPE (e.g. 50/50, 40/60, 60/40, 30/70, 70/30, 20/80, 80/20 weight % blend ratios), such as LDPE of extrusion grade.

The thickness of the innermost layer of the packaging material is for example 5 μm-50 μm, such as 10 μm-30 μm, such as 15 μm-30 μm, such as 17 μm-25 μm.

Generally, the different layers present in the packaging material are possible to detect, for example by microscopy. It may not be possible to separate one or more of the layers, for example the adhesive from the heat-sealable layer, and thus in certain embodiments the layer forming the inside of the packaging container may be a combination of the adhesive and the heat-sealable layer where the heat-sealable layer is facing the liquid or semi-liquid food product.

Naturally, the above referred examples are to be seen as a general guidance and hence other polymers are possible in the outer- and innermost and lamination layers.

Thus, the above mentioned layers of the packaging material are only to be seen as examples.

The above mentioned layers of the packaging material are conventionally applied to the respective side of the bulk material by extrusion coating and extrusion lamination techniques.

The packaging material may comprise an additional layer between the bulk layer and the outermost heat-sealable decór-covering layer.

This additional layer may have a surface weight grammage of at least 20 g/m$^2$.

The additional layer may be a paper layer or a polymer layer or polymer film.

The additional layer may be surface coated or surface modified in order to increase adhesion to the adjacent layers.

If necessary, for example in order to achieve an improved adhesion between the additional layer and the bulk layer, a binding layer may be present.

The binding layer may be selected from materials listed under the description of the laminate layer.

The packaging material may be transformed into a packaging container. The packaging container may be an aseptic packaging container. The packaging container may be a packaging container for liquid or semi-liquid food.

A packaging container formed from the packaging material according to the invention may be of any known shape.

The container may be a substantially brick- or wedge-shaped container that is durable when exposed to handling and distribution and resistant to moisture and oxygen gas during long term storage, due to the high quality packaging material, which in turn also provides for sufficient seal quality and gas barrier properties.

Further types of paperboard-based packages for liquid packaging where the invention may be useful is a brick shaped packaging container, a gable top packaging container, a wedged-shape packaging container, a square-, rect-angular- or octagonal-based packaging container. More specific examples are the so called, Tetra Brik®, Tetra Brik® Aseptic, Tetra Brik® Edge, Tetra Gemina® Aseptic, Tetra Prisma® Aseptic, Tetra Rex®, and Tetra Top® and Tetra Evero® packages or other kinds of bottle-like packages comprising a sleeve of the paperboard-based packaging material.

The package may relate to a Tetra Brik® package of a known size such as 200 ml, 250 ml, 500 ml, and 1000 ml which optionally may have a squared base, or a slanted top such as for example Tetra Brik® Edge.

It is concluded that the amount of cellulose fibres may be reduced significantly in the laminated packaging material according to the invention, while the resulting material nevertheless has maintained mechanical properties and suitability for food packaging in general, and for liquid carton packaging in particular.

Furthermore, the present invention relates to a packaging container comprising the laminated packaging material according to the invention. In particular, the invention relates to a packaging container intended for liquid or semi-liquid food packaging, comprising the laminated packaging material.

BRIEF DESCRIPTION OF THE DRAWINGS

Embodiments of the invention will now be described, by way of example, with reference to the accompanying schematic drawings, in which.

DEFINITIONS

Figure 1:
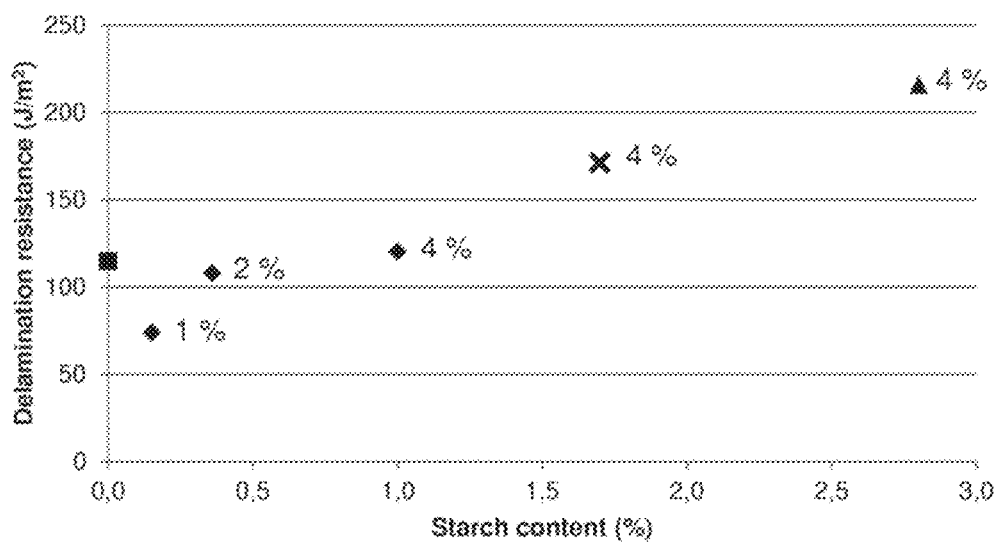
FIG. 1 shows the effect of retained cationic starch content (as weight/weight %) on delamination resistance. The diamonds represent a foam density <500 kg/m$^3$ and low amount (300 g/t of dry solids content both CPAM and microparticle) of retention agent (ra), x denote a foam density of 700 kg/m$^3$ and low amount (300 g/t of dry solids content both CPAM and microparticle) of retention agent, the triangles represent a foam density of 700 kg/m$^3$ and high amount (550 g/t of dry solids content both CPAM and microparticle) of retention agent and the squares represents a foam density of 700 kg/m$^3$ and wherein no starch was used at all. The target starch content, where 1% corresponds to a dose of 10 kg/t, 2% corresponds to a dose of 20 kg/t, and so forth is shown for each data point.

Fibre coarseness is defined as weight per fibre length and is normally expressed in units of mg/m or g/m. Coarseness depends on fibre diameter, cell wall thickness, cell wall density and fibre cross section. The coarseness value has a great influence on the paper structure. A high coarseness value indicates a thick fibre wall, giving stiff fibres unable to collapse. Thin walled fibres with low coarseness value give flexible fibres and a denser sheet. The coarser the fibres, the stronger and stiffer they will be. Coarser fibres make bulky paper. This is important for packaging paper and less important for printing paper. Coarse fibre will, however, cause an uneven paper surface.

A "foam-formed cellulosic fibre-material", "foamed cellulose material", "foamed cellulose" or a "foam-formed material of cellulose fibres" is a material that provides volume or thickness to an article from the material, without necessarily adding a lot of weight, i.e. by having a higher bulk property than conventional fibrous papers or paperboards.

"Bulk property" is the inverse of the material's density. In other words, foamed cellulose is a fibrous material, with tunable density, that can be manufactured by a foam forming process.

"Delamination" is when a material separates into different layers. Delamination is a mode of failure for fibrous materials like paperboard where fibre layers and fibres separate leading to significant loss of mechanical properties.

The "delamination strength" can be characterised by the internal bond strength of the material and can be determined by for example the Huygen Internal Bonding Energy testing device which follows TAPPI T569 and provides a value of J/m$^2$. Paper materials are subjected to out-of-plane loading in many converting operations, such as in printing, creasing, lamination, splicing and folding, which may result in delamination. The "internal bond strength", measured by a Scott Bond type test, may correlate with the "delamination resistance" of the paper material in such converting operations.

"Internal bond strength" (J/m$^2$) is defined as the energy per unit in-plane area required to delaminate a paper material in the through-thickness direction, i.e. z-direction, in a Scott Bond type test.

"Compression strength" of board is the maximum compressive force per unit width that a test piece can withstand until the onset of failure. It is expressed in kilonewtons per metre (kN/m). Measurement standard ISO 9895:2008.

"Canadian Standard Freeness" ("CSF" or "freeness") of pulp is designed to give a measure of the rate at which a dilute suspension of pulp (3 g of pulp in 1 L of water) may be drained (standard ISO 5267-2:2001).

"Compression strength ratio" MD/CD is determined as the ratio of machine directional (MD) compression strength to cross directional (CD) compression strength, which are both measured according to standard ISO 9895:2008

"Z-strength" is thickness directional tensile strength, measurement standard ISO 15754.

"Edge wicking index" (EWI) is defined as the amount of test solution absorbed by the edges of a test piece under the specific testing conditions. The result is given in kg/m$^2$.

The Schopper-Riegler test (see ISO 5267) is designed to provide a measure of the rate at which a dilute suspension of pulp may be dewatered. It has been shown that the drainability is related to the surface conditions and swelling of the fibres, and constitutes a useful index of the amount of mechanical treatment to which the pulp has been subjected.

"Grammage" is expressed as weight per unit in-plane area of paper materials and is measured in g/m$^2$.

The "ply grammage" of a layer in a laminated packaging material is the weight per unit area in g/m$^2$ of that layer.

"Thickness" is the distance between two flat surfaces, which are placed on each side of a paper material and subjected to a pressure of 100 kPa. It is expressed in micrometers (μm).

A "bulk layer" or a "core layer" is a layer that contributes largely to the mechanical rigidity and strength properties and dimensional stability properties, of a laminated material. This is normally the thickest layer of a laminated (sandwich) material, without necessarily being the strongest or densest material. In a stiff sandwich material, there is often a "bulky" distancing or spacer layer in the center, between two flange layers, i.e. facing layers, which contribute to the total stiffness of the construction by their Young's modulus and/or higher tensile stiffness properties. The grammage of the bulk layer is assessed in accordance with ISO 536. The bulk layer thickness can be assessed by microscopy or by a ply grammage method, as discussed herein below. The grammage of a bulk layer in a laminated packaging material is calculated as the difference between the total grammage and the ply grammages of the polymer and aluminium foil layers.

In this context, "low density" in connection with a cellulose material or bulk material for a laminated packaging material for liquid packaging, means a density which is lower than that of normal paperboard or carton for that purpose, i.e. ultimately lower than 900 kg/m$^3$, such as lower than 700 kg/m$^3$, such as from 100 to 600 kg/m$^3$, such as from 100 to 500 kg/m$^3$, such as from 200 to 500 kg/m$^3$, such as lower than 450 kg/m$^3$.

A "thickness" referring to the packaging material, a packaging container, or layers thereof, is, unless otherwise defined, determined by microscopy, for example by a suitable microscope such as those marketed under the name Olympus, for example BX51.

"Liquid or semi-liquid food" generally refers to food products having a flowing content that optionally may contain pieces of food. Dairy and milk, soy, rice, grains and seed drinks, juice, nectar, still drinks, energy drinks, sport drinks, coffee drinks, tea drinks, coconut water, wine, soups, jalapenos, tomatoes, sauce (such as pasta sauce), beans and olive oil are some non-limiting example of food products contemplated.

"Aseptic" in connection with a packaging material and packaging container refers to conditions where microorganisms are eliminated, in-activated or killed or where the level of microorganisms is significantly reduced. Examples of microorganisms are bacteria, spores and yeasts. Generally, an aseptic process is used when a product is aseptically packed in a packaging container.

The term "heat-sealing" refers to the process of welding one surface of a thermoplastic material to another thermoplastic surface. A heat-sealable material should, under the appropriate conditions such as when sufficient heating and pressure are applied, be able to generate a seal when pressed against and in contact with another suitable thermoplastic material. Suitable heating can be achieved by induction heating or ultrasonic heating or other conventional contact or convection heating means, e.g. hot air.

Methods

Grammage (in (g/m$^2$) was determined using a version of ISO 536 having less samples and smaller samples size. Circular test pieces with an in-plane area of 100±1 cm$^2$ were produced using a cutting device (disc cutter or punch). Five circular test pieces were each weighed on a balance reading to an accuracy of ±0.5%. The grammage of each test piece was calculated by dividing the mass of the test piece by the in-plane area.

Thickness (the distance (in μm) between the two flat surfaces, which are placed on each side of the paper material and subjected to a pressure of 100 kPa) was determined using a version of ISO 534 wherein fewer samples were analysed, but several spots per sample were measured. Circular test pieces with an in-plane area of 100±1 cm$^2$ were produced using a cutting device (disc cutter or punch). Five test pieces were produced for each sample. For each test piece, the thickness was measured as dead-weight micrometer in accordance with ISO 534 in three different spots and the test piece thickness was evaluated as the average value of these three measurements.

Tensile properties were determined using a version of ISO 1924:3. Test piece of a given dimension, 15 mm wide and long enough (≥150 mm) were strained to break at a constant rate of elongation (100 mm/min) using a testing machine that automatically records both the tensile force and the elongation. Tests were done in machine direction (MD) and cross direction (CD) separately. 10 test pieces were used for each sample in accordance with ISO 1924:3.

Compression strength (short-span compression test (SCT)) was determined using a version of ISO 9895 wherein 10 samples in each directions were tested. A test piece, 15 mm wide and >70 mm long was clamped between two clamps, spaced 0.70 mm apart, which were forced towards each other until a compressive failure occurred. The maximum force was measured and the compression strength was calculated. The paper or board was tested on 10 test pieces in MD and 10 test pieces in CD direction separately.

Edge wicking in lactic acid 23° C., 1 h was determined as follows. Water resistant tape (e.g. Scotch EI-tape no. 5 from 3M) was applied on both sides of the sample (wrinkles were avoided). A cutting device was used to cut out 1 set of 5 test pieces, 75 mm (CD)×25 mm (MD), and the pieces were marked accordingly. The 5 pieces were weighed together, and the result was rounded down/up to the nearest mg. 1% (volume/volume) lactic acid solution was prepared and poured into a vessel (247×395 mm) to a level of 10±1 mm. The vessel was of plastic or stainless steel. The temperature in the vessel was held at 23° C.±1° C. The test pieces were removed after 1 h±2 min and placed between two blotting papers. A brass-roller (face width 200 mm and weight 10±0.5 kg) was moved once back and forth over the test pieces between the blotting papers without applying any extra pressure. The test pieces were weighed together, and the result was rounded down/up to the nearest mg. The edge wicking index was calculated as $$EWI = \frac{\text{(Total weight after test)} - \text{(Total weight before test)}}{\text{(Board thickness)} \times \text{(Total circumference of the sample)}}$$

Delamination resistance was determined as follows. A test piece was cut out and mounted between a steel anvil and an L-shaped aluminium bracket using double-sided adhesive tape. A specific pressure was subjected to the metal plates to ensure repeatable bonding and a pendulum was released from an initial horizontal position and allowed to hit the L-shaped bracket when reaching its vertical position, causing the test piece to delaminate. The consumed energy by the delamination process was evaluated by recording the peak excess swing of the pendulum. The internal bond strength was calculated as the recorded energy divided by the in-plane area of the test piece.

Residual z strain (the residual strain in z-direction (thickness direction)) after a specified load on the sample was determined with a Lloyd LR10K loading device. The sample area exposed to loading was 15.2 cm$^2$, with a circular radius of 22 mm. The board sample was placed onto the loading table and a maximum pressure of 2 MPa (force 3041 N) was applied on the sample for a period of 1 s. The relative change was calculated with the initial thickness of the sheet (measured with a separate standard device) and the reading of displacement sensor showing the absolute thickness change, i.e. permanent thickness reduction, from the compression.

The residual strain was determined as the point where there was no additional clear drop in the loading force. At least five parallel measurements were carried out in separate points. The residual strain measurement can also be made with sequential loadings, reporting the magnitude of thickness change after each loading.

Mini-Cobb 30 measurement was determined as follows. A dry specimen was weighed and placed under a cylinder with an internal diameter of 3 cm. 7 ml of water was poured into the cylinder. After 30 s the water was poured out. The excess water was removed from the specimen using plotting paper and roller. The specimen was weighed while wet and the amount of water absorbed by 1 m$^2$ of specimen material was calculated.

DETAILED DESCRIPTION OF PREFERRED EMBODIMENTS OF THE INVENTION

FIG. 1 shows the effect of retained cationic starch content on delamination resistance. Cationic starch (the same for all samples and dosed at the proportion showed next to the marker) was added to increase the strength and was added to all samples apart from the zero-reference (filled square). Includes also foam density (500 kg/m$^3$ and 700 kg/m$^3$) and retention agent dose (CPAM+microparticle, either 300 g/t+ 300 g/t (low ra) or 550 g/t+550 g/t (high ra)). As can be seen in FIG. 1 and Table 1, in foam forming with SDS, the retained cationic starch content is higher with increased foam density. In low foam density areas, with 40 kg/t dose (i.e. starch content target of 4%), the retained starch content was 1% whereas in the higher foam density, it was 1.7% with constant retention aid dose. In the experiments, the dose of cationic starch was 10, 20 or 40 kg/t (i.e. targeting starch contents of 1%, 2% and 4%, respectively) (dose marked next to each ticker), while the retained amount was 0.2% (weight/weight) to 1.0% for the samples produced in 500 kg/m$^3$ foam density and 1.7% and 2.8% for samples produced in 700 kg/m$^3$ foam density. The difference between the two latter values originates in the retention chemical dosage: 2.8% starch content is achieved with 550 g/t dose (high ra) of both CPAM and microparticle, whereas the content of 1.7% was achieved with doses of 300 g/t (low ra (retention aid dose)), respectively. These results show that a way to increase the delamination resistance with the selected strength additives may include the use of higher foam density and increased dosages of retention chemicals.

TABLE 1

| | Retained starch content (%) | hrHW content (%) | Sheet density (kg/m$^3$) | Delamination resistance (J/m$^2$) | z-residual strain (%) | EWI (kg/m2) |
|---|---|---|---|---|---|---|
| Fd <500 kg/m$^3$, ra low, starch dose 10 kg/t | 0.15 | 10 | 264 | 74 | 12.1 | 0.30 |
| Fd <500 kg/m$^3$, ra low, starch dose 20 kg/t | 0.36 | 10 | 272 | 108 | 9.9 | 0.89 |
| Fd <500 kg/m$^3$, ra low, starch dose 40 kg/t | 1.00 | 10 | 282 | 120 | 8.9 | 1.06 |
| Fd 700 kg/m$^3$, ra low starch dose 40 kg/t | 1.70 | 12 | 285 | 171 | 6.9 | 0.66 |
| Fd 700 kg/m$^3$, ra high starch dose 40 kg/t | 2.80 | 12 | 309 | 216 | 5.9 | 0.38 |
| Fd 700 kg/m$^3$, no starch | 0.00 | 12 | 289 | 117 | n/a | 0.22 |
| Fd 700 kg/m$^3$, ra high, hrHW 6% starch dose 40 kg/t | n/a | 12 | 325 | 198 | 6.2 | 0.40 |

Data showing the effect of foam density (Fd), cationic starch content, refined reinforcement fibre (hrHW) content and retention aid dose (ra) on sheet density, delamination resistance and z-directional residual strain. The main component of the furnish was coarse CTMP (CSF 620 to 650 ml) combined with highly refined hardwood (hrHW) to generate higher strength.

Figure 2:
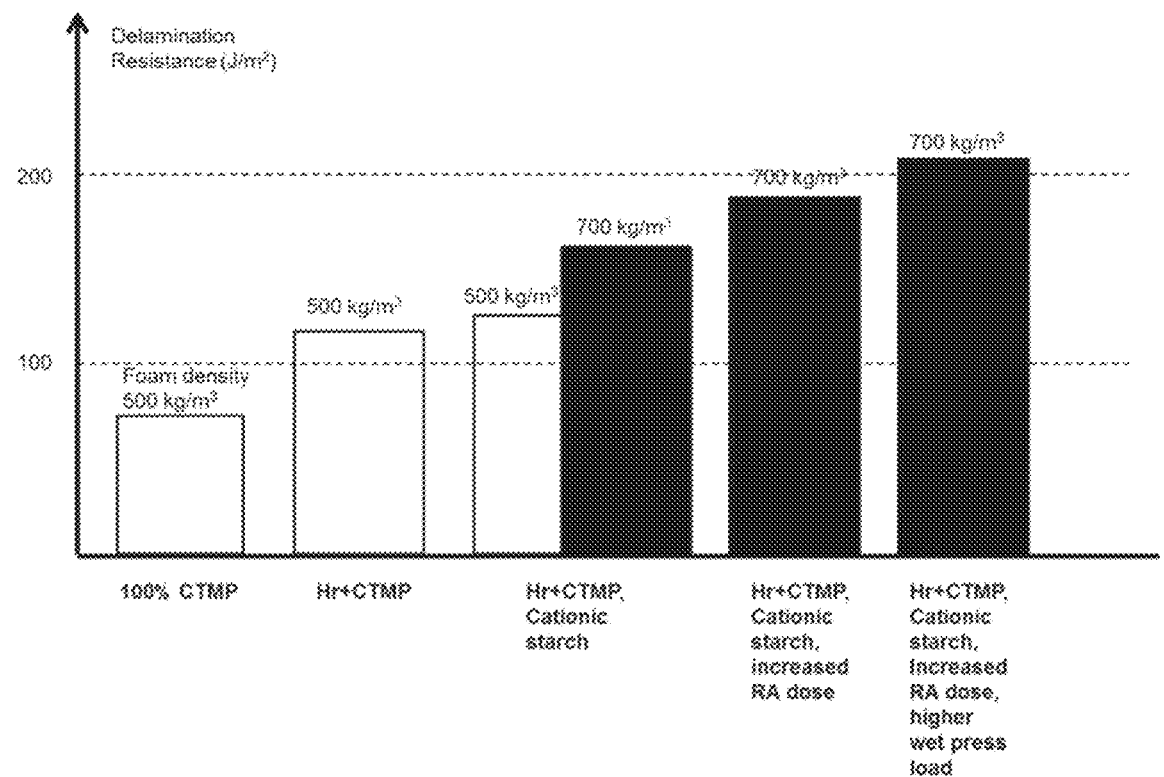
FIG. 2 shows the delamination resistance for different materials produced according to the present invention, compared to a reference sample not comprising the cellulose reinforcement fraction. The data is collected from five separate pilot-machine trials. Hr stands for highly refined fibres (the same as hrHW—hardwood fibres) in Table 1 and RA stands for retention agent. The black bars represent experiments where the foam density was 700 kg/m$^3$ and the white bars represent experiments where the foam density was between 500 kg/m$^3$.

FIG. 2 shows the delamination resistance for different materials produced according to the present invention, compared to a reference sample not comprising the cellulose reinforcement fraction (i.e. 100% CTMP). These experiments demonstrate that by adding a cellulose reinforcement fraction to the coarse cellulosic fibres (here CTMP), the delamination strength increases from about 75 J/m$^2$ to about 120 J/m$^2$. The addition of cationic starch as a dry strength agent further increases the delamination strength to 125 J/m$^2$. By increasing the foam density (Fd) from 500 kg/m$^3$ to 700 kg/m$^3$, the delamination strength increased to about 160 J/m$^2$. By increasing the amount of retention agent (both CPAM and microparticles) from 300 g/t to 550 g/t, the delamination strength increased to approximately 180 J/m². Further improvement was generated by increasing the wet press load from 800 to 1000 kN/m, and the delamination strength reached values over 200 J/m². Wet press load is an operation where water is removed from the fibre web by the means of mechanical compression. Water removal pressure is primarily influenced by the linear load (kN/m) that describes the applied force per pressing width (cross direction width).

Figure 3:
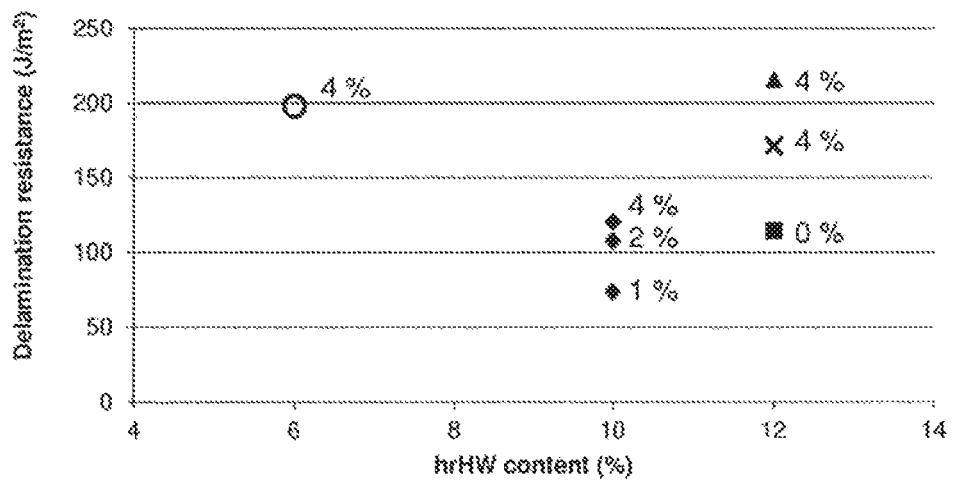
FIG. 3 shows how the delamination resistance depends on the hrHW content. The diamonds represent a foam density <500 kg/m$^3$ and low amount (300 g/t of dry solids content both CPAM and microparticle) of retention agent (ra), x denotes a foam density of 700 kg/m$^3$ and low amount (300 g/t of dry solids content both CPAM and microparticle) of retention agent, the triangles represent a foam density of 700 kg/m$^3$ and high amount (550 g/t of dry solids content both CPAM and microparticle) of retention agent, the squares represent a foam density of 700 kg/m$^3$ and wherein no starch was used at all and o denotes a foam density of 700 kg/m$^3$ and high amount (550 g/t of dry solids content both CPAM and microparticle) of retention agent. The target starch content, where 1% corresponds to a dose of 10 kg/t, 2% corresponds to a dose of 20 kg/t, and so forth is shown for each data point.

As can be seen in FIG. 3, higher foam density, due to improved fines retention, contributes to higher delamination strength of a sheet of the foam-formed cellulose material. Used additions of cationic starch were 1, 2 or 4% of the dry solids flow (respective to 10, 20 and 40 kg/t). It is also shown that, in comparison to lower foam density (500 kg/m³), higher foam density (700 kg/m³) generates higher delamination resistance with lower proportion of highly refined fibre component. Thus, Less hr is needed when density is higher and amount of retention aid is high, as well as retained content of starch.

Figure 4:
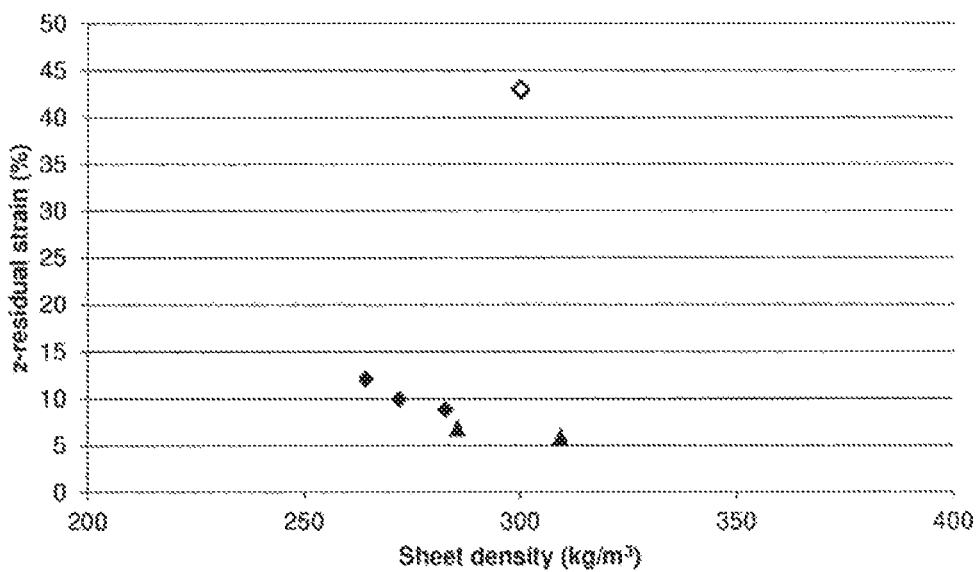
FIG. 4 shows how the z-residual strain depends on the sheet density. The filled diamonds represent a foam density <500 kg/m$^3$ and 10% (weight/weight) hrHW, the triangles denote a foam density of 700 kg/m$^3$ and 12% hrHW and the diamonds represent a foam density of <500 kg/m$^3$ and 12% MFC (microfibrillated cellulose). MFC has an average fibre length of 100 nm to 0.1 mm and fibre diameter of 3 to 50 nm.

FIG. 4 shows that the Z-directional residual strain is lower for sheets with higher fines (i.e. hrHW) (and starch) retention. With MFC (which is an example of a material which is not according to the invention, denoted by an open diamond), the z-residual strain was significantly higher. With MFC containing sample, the fibre furnish consisted of 60% CTMP (CSF 600 ml), 20% of unrefined softwood kraft and 12% of microfibrillated cellulose (MFC).

Figure 5:
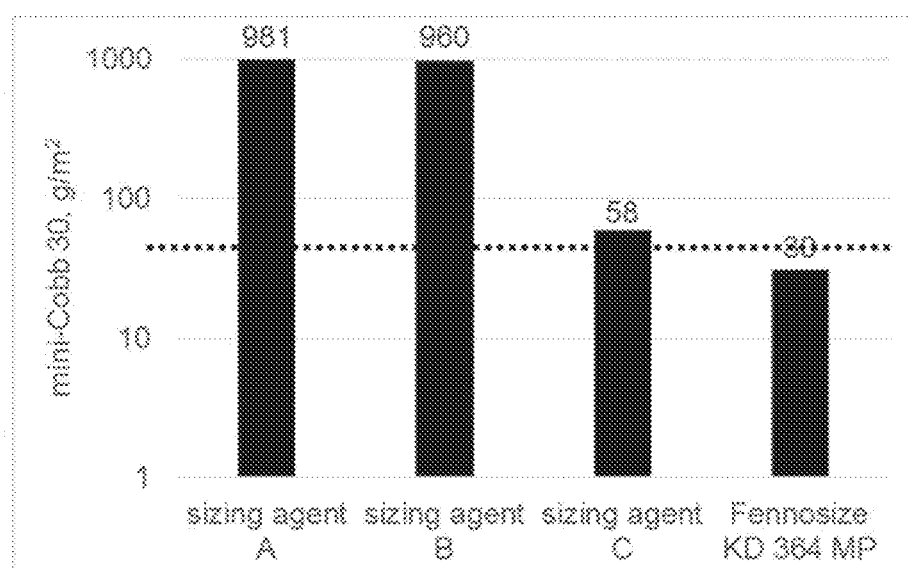
FIG. 5 shows the mini-Cobb 30-values for materials produced according to the present invention using different sizing agents. Sufficient sizing has been achieved when the mini-Cobb 30-value is less than 50 g/m$^2$ (the dotted line in the diagram). A is anionic while B and C are cationic products. Other details of the formulations are not known.

FIG. 5 shows the mini-Cobb 30-values for packaging materials produced according to the present invention using different sizing agents. Sufficient sizing has been achieved when the mini-Cobb 30-value is less than 50 g/m² (the dotted line in the diagram). Surfactants are known to disturb AKD-sizing. Furthermore, the negative charge of SDS probably neutralizes cationically stabilized AKD. Thus, SDS interferes with adsorption of AKD particles onto fibre surfaces. Moreover, the AKD-product has to be compatible with the entire foam forming chemistry. For these reasons, the AKD-product was selected carefully by large laboratory tests. The tests were done using CTMP 600 mL as fibre furnish. The retention system (CPAM+microparticle) as well as cationic starch addition promoted sizing and together with them the Fennosize KD 364 AKD-product achieved the sufficient sizing level. Thus, a preferred AKD-product is of high cationicity. The reason for the compatibility of Fennosize KD 364 and the foam forming chemistry could be the proportionally high cationic charge in stabilization system of AKD. Sizing was defined to be successful if the mini-Cobb 30-value was 50 g/m² or lower (dotted line in FIG. 5). Longer delay of AKD in foam was found to decrease the efficiency of sizing and thus the sizing agent was fed into the foam just before the head box in the pilot machine.

Figure 6:
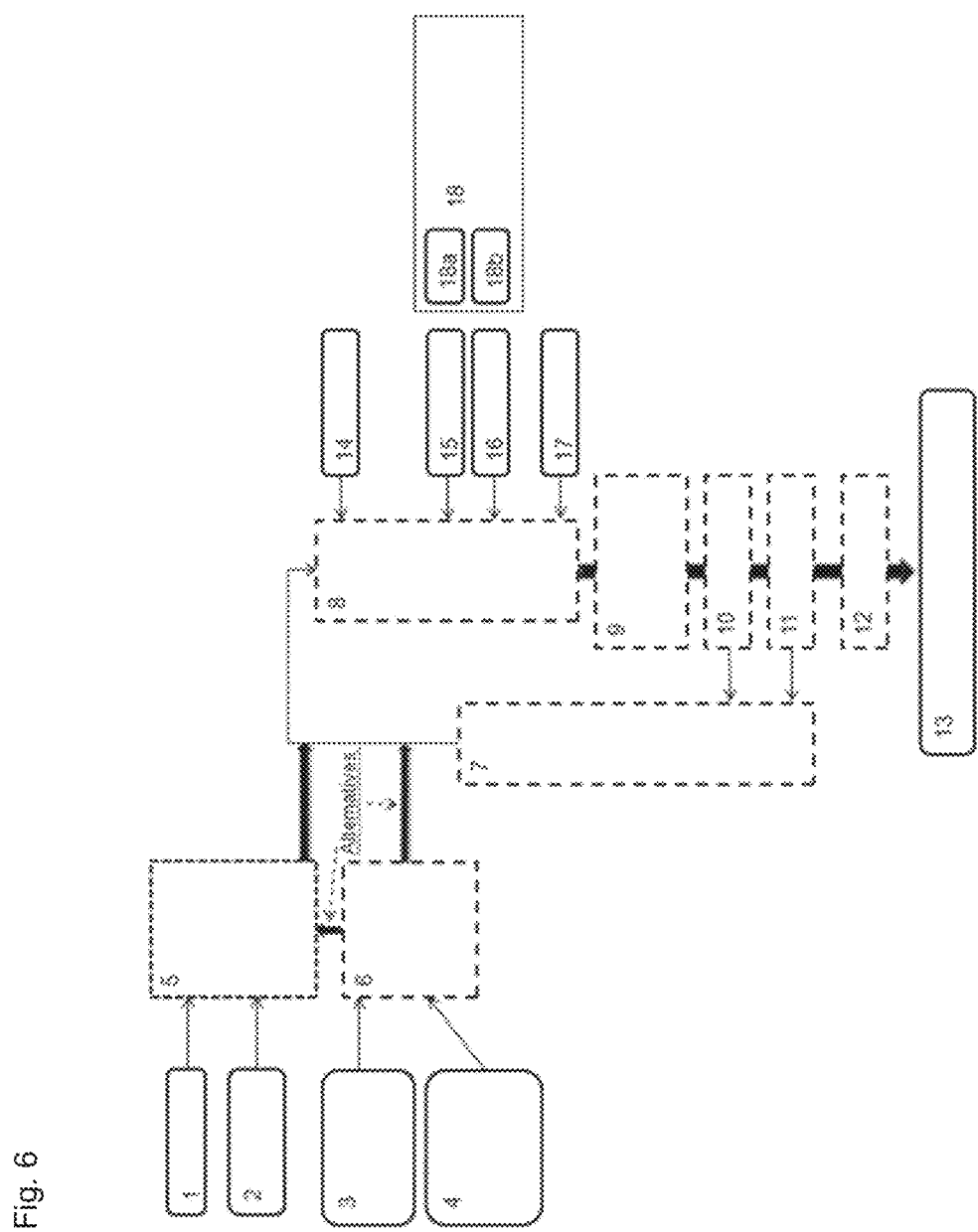
FIG. 6 shows a flowchart of a method according to the present invention.

FIG. 6 shows a flowchart illustrating one embodiment of the method according to the invention.

1: Air
2: Surfactant
3: Cellulose fibre (such as coarse CTMP)
4: Cellulose reinforcement fraction (such as highly refined hardwood)
5: Foam generation, In a separate unit (such as a tank)
6: Fibre furnish mixing
7: Foam circulation
8: Headbox feed flow
9: Distribution onto a forming wire (headbox)
10: Forming section
11: Wet pressing
12: Drying
13: Foam formed cellulosic fibre material
14: Cationic starch
15: CPAM
16: Microparticle
17: AKD
18: As an alternative retention system instead of using CPAM and microparticle
18a: TA
18b: PEO Foam generation: surfactant and gas (air) is mixed with water, the foam density will be dependent on the amount of surfactant and mixing energy. Stock preparation: the fibre components are prepared to required freeness (by refining) and mixed to a stock. Foam and stock mixing: Foam and fibre stock are combined (fibrous foam). Headbox feed flow: Fibrous foam is pumped towards the headbox and the needed chemicals are added into the headbox feed flow. Dewatering including drying: Foam is removed in the forming section by using suction boxes and forming wire (fibres retain on the forming wire while the foam goes through the wire and to foam circulation), by mechanical compression in wet pressing and by heating up the moist board, e.g. with drying cylinders.

Figure 7A:
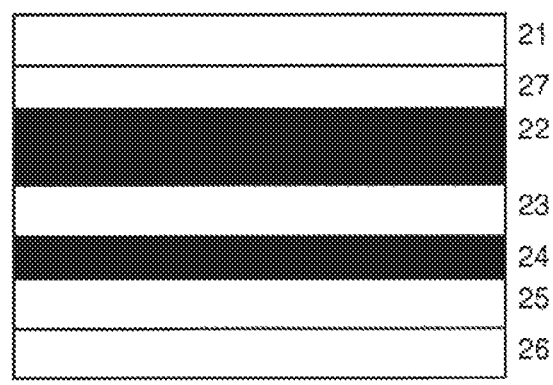
FIGS. 7a and 7b are cross-sectional views of laminated packaging materials according to the present invention.

FIG. 7a schematically shows a cross-section of an example of a laminated packaging material. The outer, décor-covering layer (21) is a polyolefin such as a suitable PE or PP or blends or copolymers thereof. The outer layer may be used to provide cover of a printed pattern, a hole and/or weakening (not shown in the figure) which is provided in the bulk layer (22), which layer is arranged on one side of the outer layer (21). Between the outer layer (21) and the bulk layer (22) an additional layer (27) of paper or cellulose is arranged. The bulk layer (22), on the side opposite the outer layer, has a laminate layer (23) selected from suitable polyolefins such as PE or PP or blends or copolymers thereof. The laminate layer provides adhesion to the oxygen barrier (24), which is arranged on the opposite side of the laminate layer (23). The barrier layer (24) provides the desired barrier such as oxygen, light, water and vapour barrier depending on the specific need determined by the product to be packed. The barrier layer can for example be an aluminium foil or a vapour deposited film, such as a metallized or vapour deposition coated film, such as a PECVD (plasma enhanced chemical vapour deposition) coated film. On the side opposite the laminate layer an adhesive polymer (25) is arranged on the barrier layer. The adhesive (25) may for example be applied by extrusion coating. When the barrier layer is aluminium foil the adhesive could be a suitable ethylene (meth)acrylic acid copolymer (E(M)AA) adhesive marketed under the tradename Primacor® or Nucrel®. On the side opposite the barrier layer, the adhesive is provided with a heat-sealable layer (26) such as a suitable polyolefin such as PE or PP or blends or copolymers thereof. The heat-sealable layer is the layer facing the product in the finished packed packaging container.

Figure 7B:
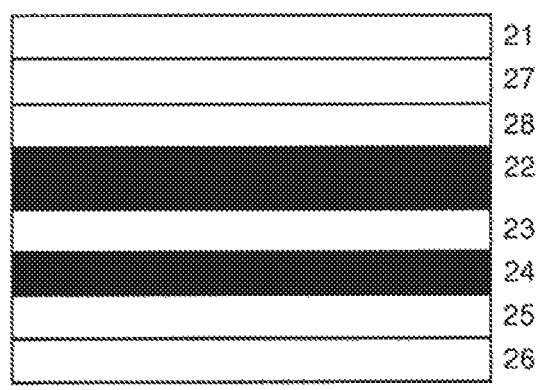

FIG. 7b schematically shows a cross-section of a second example of a laminated packaging material. The outer layer (21) (to be directed towards the outside of a package made from the material) is a polyolefin such as a suitable PE or PP or blends or copolymers thereof. The outer layer may be used to provide cover for a printed pattern, a hole and/or weakening (not shown in the figure) which is provided in one or more of the other layers of the laminate. On one side of and adjacent the outer layer, a thin paper (27) of a surface weight of about 100 g/m2 or lower is arranged. The thin paper layer (27) is laminated to a bulk layer (22), opposite the outer layer, by an intermediate thermoplastic outer binding layer (28). The binding layer (28) may be selected from suitable polyolefins such as PE or PP or blends or copolymers thereof. The binding layer (28) binds the bulk cellulose layer (22) and the thin paper layer (28) together. The bulk layer (22), is further laminated to a laminate layer (23) of thermoplastic polymer, on the side of the bulk layer opposite the side laminated to the binding layer (28). The laminate layer (23) provides adhesion to an oxygen barrier layer (24), which is arranged on the opposite side of the laminate layer (23). The barrier layer (24) provides the desired barrier such as oxygen, light, water and vapour barrier depending on the specific need determined by the product to be packed. The barrier layer can for example be an aluminium foil or a vapour deposited film, such as a metallized or vapour deposition coated film, such as a PECVD coated film. On the side opposite the laminate layer an adhesive polymer (25) is arranged on the barrier layer. The adhesive (25) may for example be applied by extrusion coating. When the barrier layer is aluminium foil the adhesive could be a suitable ethylene (meth)acrylic acid copolymer (E(M)AA) adhesive marketed under the tradename Primacor® or Nucrel®. On the side opposite the barrier layer, the adhesive is provided with a heat-sealable layer (26) such as a suitable polyolefin such as PE or PP or blends or copolymers thereof. The heat-sealable layer is the layer facing the product in the finished packed packaging container.

A packaging material according to the present invention may be a laminate packaging material which comprises an outermost thermoplastic, heat sealable décor-covering layer which on one side of the layer has a bulk layer comprising the foam-formed cellulosic fibre-material of the invention, which bulk layer on the side opposite the décor-covering layer has a laminate layer, said laminate layer, on the side opposite the bulk layer has an oxygen barrier, and said oxygen barrier, on the side opposite the laminate layer has a heat-sealable layer.

Furthermore, a laminated packaging material may comprise a bulk layer having a density of less than 700 kg/m³ and comprising foam-formed cellulosic fibre-material according to the present invention. The packaging material further comprises an additional layer arranged by means of a binding layer, such as for example a thermoplastic polymer binding layer, such as a polyolefin-based polymer or copolymer binding layer, wherein the binding layer is arranged between the bulk layer and the additional layer. The additional layer has a decorative printed pattern arranged on the side opposite the binding layer. The bulk layer is provided with a barrier layer on the side opposite the binding layer. A barrier layer may be provided with a heat-sealable layer on the side opposite from the bulk layer. The outermost layer covering the printed decorative pattern is a polyolefin layer, such as an outermost heat-sealable polyolefin layer to be in contact with the surroundings of a packaging container, for example low density polyethylene (LDPE) or polypropylene. The outermost thermoplastic layer provides additional protection, e.g. moisture resistance and scratch/wear resistance, and stability to the packaging container.

Figure 8:
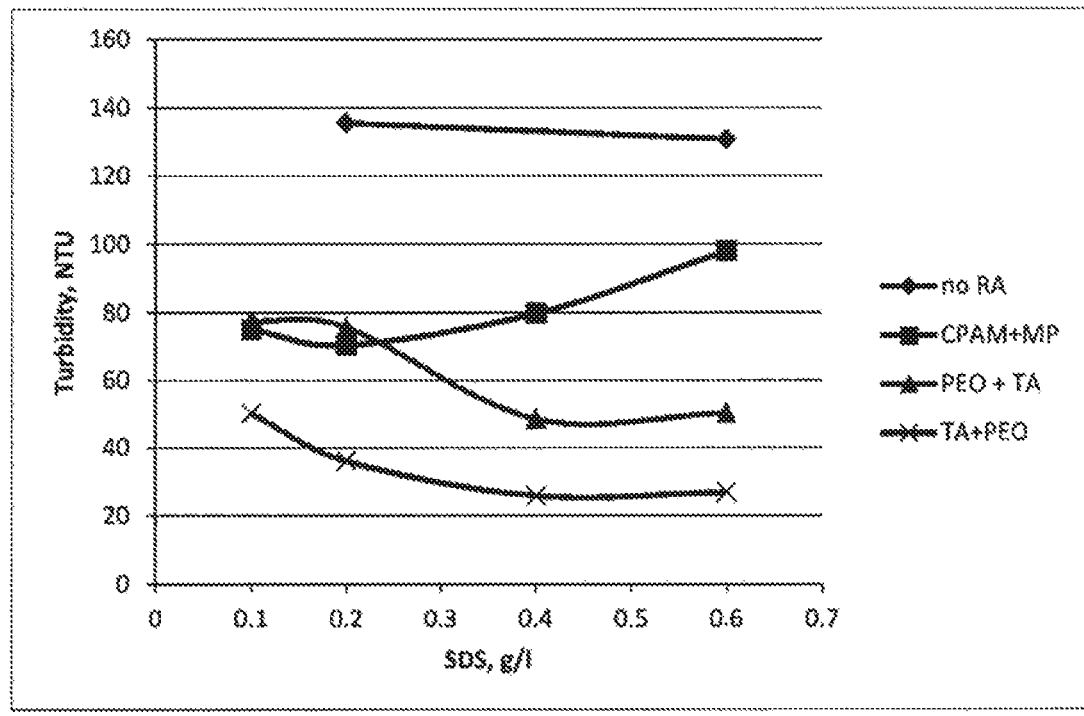
FIG. 8 shows the turbidity of DDJ filtrates of pulp suspensions wherein different retention systems were used at different concentrations of SDS. Filled diamonds represent pulp suspensions to which no retention system was added; filled squares represent pulp suspensions to which CPAM was added before the microparticles were added; filled triangles represent pulp suspensions to which PEO was added before TA was added; and x denote pulp suspensions to which TA was added before PEO was added. The dose of each retention aid component, i.e. CPAM, microparticles, PEO and TA was 0.3 kg/t of dry pulp.

FIG. 8 shows the effect of the SDS surfactant amount on turbidity (value is relative to the amount of solids that went through the 100 mesh wire) for different retention systems. The pulp contained 80% chemithermomechanical pulp (CTMP) and 20% heavily refined hardwood pulp (hrHW). The turbidity was measured using nephelometer and the result is expressed as nephelometric turbidity units (NTU). High turbidity means low retention. The turbidity was the highest (=lowest retention), when retention aids were not used (filled diamonds). The amount of surfactant (SDS) had no effect on turbidity in these test points. With low SDS concentration, 0.1-0.2 g/l, the CPAM+MP system (filled squares) and the PEO+TA system (filled triangles) gave the same retention. However, when the SDS content was increased, the retention decreased (reflected by increased turbidity) for the CPAM+MP system and improved (reflected by decreased turbidity) for the PEO+TA system. In the case where TA was added before PEO (×), the retention was the best and was improved further with increasing the SDS content. The results showed that the non-cationic TA+PEO system is very efficient in foam forming, especially when the SDS content is high.

Figure 9:
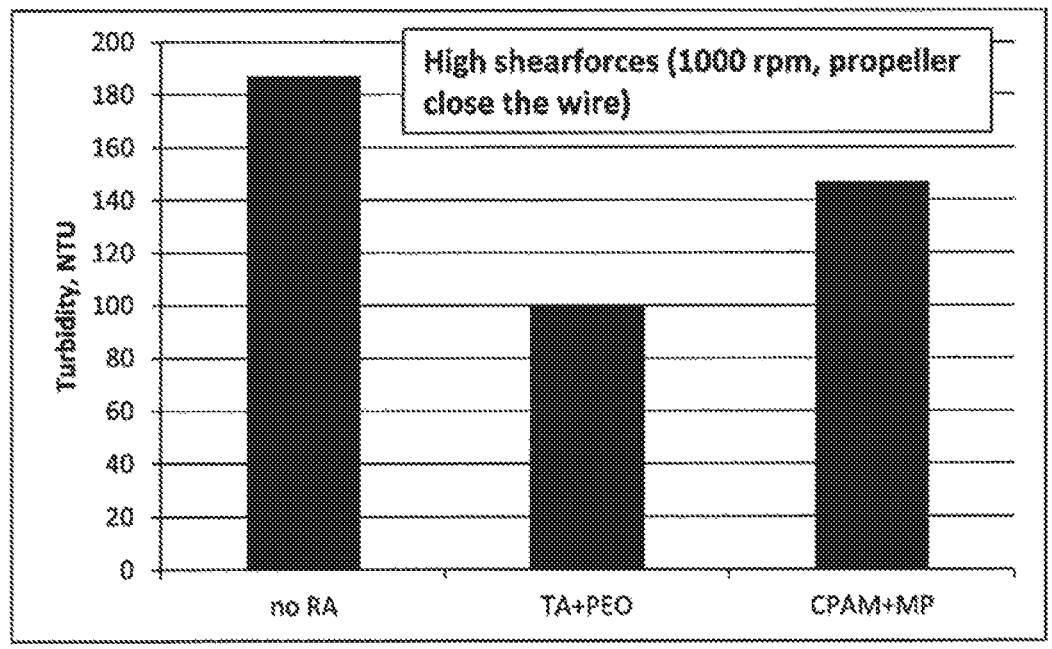
FIG. 9 shows the turbidity of DDJ filtrates of pulp suspensions with different retention systems at high shear forces.

As can be seen in FIG. 9, the TA+PEO-system seems to work better than the CPAM+MP system when the suspension is subjected to high shear forces. The experiment was performed similarly to the one of FIG. 2, but the stirrer 1 was set close to the wire 3 and the stirrer 1 was on with 1000 rpm during the filtration of foam.

From the description above follows that, although various embodiments of the invention have been described and shown, the invention is not restricted thereto, but may also be embodied in other ways within the scope of the subject-matter defined in the following claims.

The invention claimed is:

1. A method for manufacturing a foam-formed cellulosic fibre-material, comprising:
   (a) providing an aqueous foam comprising a gas dispersed as bubbles in an aqueous phase, wherein said aqueous phase comprises a surfactant;
   (b) adding cellulose fibres to the aqueous foam, thus forming a fibrous foam composition, wherein the cellulose fibres are added as
      coarse cellulosic fibres, selected from the group consisting of mechanical, chemi- mechanical, thermo-mechanical, chemithermomechanical pulp (CTMP) fibres and Neutral Sulfite Semi Chemical (NSSC) pulp fibres, in an amount of 85% to 97%, by weight of the total amount of cellulose fibres, wherein the coarse cellulosic fibres have a Canadian Standard Freeness value of 400-750 ml; and
      a cellulose reinforcement fraction in an amount of 6% to 12%, by weight of the total amount of cellulose fibres, wherein the cellulose reinforcement fraction is a heavily refined fibre component selected from the group consisting of heavily refined chemical pulp having a SR range higher than SR°80, heavily refined chemithermomechanical pulp (hrCTMP) having a CSF less than 70 mL, and a combination thereof, wherein the fibrous foam composition comprises a starch in an amount of 1 to 4% based on dry solids content of the fibrous foam composition;
   (c) distributing the fibrous foam composition onto a substrate or into a mould; and
   (d) reducing the amount of water in the distributed fibrous foam composition to obtain the foam-formed cellulosic fibre-material in its final shape, wherein the foam-formed material produced by the method has a density of 200 to 450 kg/m³ and a delamination strength of at least 100 J/m².

2. The method according to claim 1, wherein the cellulose reinforcement fraction has been treated with a cationic dry strength agent, wherein the cationic dry strength agent is selected from the group consisting of cationic starch (CS), cationic polyacrylamide (CPAM), glyoxalated polyacrylamid (GPAM) and polyaminoamid-epichlorohydrine (PAE).

3. The method according to claim 1, wherein the cellulose reinforcement fraction has been treated with polyelectrolyte multilayering method (PEM), resulting in three polymer layers, wherein a first polymer layer on the cellulose reinforcement fraction is a cationic polymer; a second polymer layer on the cellulose reinforcement fraction is an anionic polymer; and wherein a third polymer layer on the cellulose reinforcement fraction is a cationic polymer.

4. The method according to claim 1, further comprising (e) mixing the coarse cellulosic fibres and the cellulose reinforcement fraction to form a cellulose fibre mixture; wherein the mixing is performed before the adding of the cellulose fibres to the aqueous foam.

5. The method according to claim 1, wherein the surfactant is sodium dodecyl sulphate (SDS) or sodium lauryl ether sulfate (SLES).

6. The method according to claim 1, further comprising: (f) adding a retention system to the fibrous foam composition obtained in (b), wherein the retention system comprises polyethylene oxide (PEO) and tannic acid (TA).

7. The method according to claim 1, further comprising: (g) performing hydrophobic sizing by adding alkylketene dimer (AKD), alkyl succinic anhydride (ASA) and/or rosin sizing directly before (c).

8. The method according to claim 1, further comprising: (h) performing hydrophobic sizing by applying sizing agent by spray on the distributed fibrous foam composition obtained in (c), wherein the sizing agent comprises alkylketene dimer (AKD) and/or alkyl succinic anhydride (ASA).

9. The method according to claim 1, wherein the density of the fibrous foam composition before reduction of an amount of water is about 600-750 kg/m$^3$, and wherein the average bubble size is 100 μor below.

10. The method according to claim 1, wherein the cellulose reinforcement fraction has been treated with polyelectrolyte multilayering method (PEM), resulting in three polymer layers, wherein a first polymer layer on the cellulose reinforcement fraction is a cationic polymer comprising cationic starch (CS); a second polymer layer on the cellulose reinforcement fraction is an anionic polymer comprising carboxy methyl cellulose (CMC), anionic starch (AS) or anionic polyacrylamide (APAM); and wherein a third polymer layer on the cellulose reinforcement fraction is a cationic polymer comprising cationic starch (CS).

11. The method according to claim 1, wherein the coarse cellulosic fibres are CTMP fibres, wherein the cellulose reinforcement fraction is highly refined hardwood fibres.

12. The method according to claim 1, wherein the cellulose reinforcement fraction is heavily refined chemithermomechanical pulp (hrCTMP) having a CSF less than 70 mL.

13. The method according to claim 1, wherein the cellulose reinforcement fraction is a heavily refined fibre component having an average fibre diameter of about 20 to 30 μm.

* * * * *